US008902748B2

(12) United States Patent
Nistor et al.

(10) Patent No.: US 8,902,748 B2
(45) Date of Patent: *Dec. 2, 2014

(54) MULTIPLEXING AND DEMULTIPLEXING DATA

(71) Applicants: Adrian Ioan Nistor, Bucharest (RO); Jason Pelly, Reading (GB)

(72) Inventors: Adrian Ioan Nistor, Bucharest (RO); Jason Pelly, Reading (GB)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,229

(22) Filed: Nov. 25, 2013

(65) Prior Publication Data

US 2014/0079078 A1 Mar. 20, 2014

Related U.S. Application Data

(63) Continuation of application No. 12/936,965, filed as application No. PCT/IB2008/051651 on Apr. 29, 2008, now Pat. No. 8,593,951.

(51) Int. Cl.
*H04J 1/16* (2006.01)
*H04J 3/02* (2006.01)
*H04J 3/04* (2006.01)

(52) U.S. Cl.
CPC .. *H04J 3/02* (2013.01); *H04J 3/047* (2013.01)
USPC ........... 370/230; 370/252; 370/332; 370/535; 455/450; 455/574

(58) Field of Classification Search
USPC .......... 370/221, 412–418, 535; 711/133, 159, 711/171, 173
See application file for complete search history.

(56) References Cited

U.S. PATENT DOCUMENTS

| 5,781,918 | A | * | 7/1998 | Lieberman et al. | 711/5 |
|---|---|---|---|---|---|
| 6,295,594 | B1 | * | 9/2001 | Meier | 711/171 |
| 6,324,625 | B1 | * | 11/2001 | Singer et al. | 711/154 |
| 6,529,523 | B1 | * | 3/2003 | Kato | 370/466 |
| 6,684,317 | B2 | * | 1/2004 | Wang et al. | 711/218 |
| 6,792,484 | B1 | * | 9/2004 | Hook | 710/52 |
| 7,068,545 | B1 | * | 6/2006 | Kimelman et al. | 365/189.16 |
| 7,342,915 | B2 | * | 3/2008 | Okumura et al. | 370/350 |
| 7,870,352 | B2 | * | 1/2011 | Stalker | 711/159 |
| 2004/0153566 | A1 | * | 8/2004 | Lalsangi et al. | 709/234 |

(Continued)

OTHER PUBLICATIONS

International Search Report for correlating International Application PCT/IB2008/051651, mailed Jan. 26, 2009, 3 pages.

*Primary Examiner* — Jeffrey M Rutkowski
*Assistant Examiner* — Rasha Fayed

(57) ABSTRACT

Apparatus arranged to perform data multiplexing or demultiplexing or a non-transitory computer readable medium comprising a computer program which, when executed by a computer, carries out a method of multiplexing or demultiplexing data, the apparatus comprising a memory, an interface, and a processing unit arranged to determine locations of corresponding regions of the memory for corresponding channels based on data sizes and time-unit-numbers that have passed since a previous corresponding quantity of channel data for a corresponding channel was last stored in the memory or processed, wherein the data sizes and time-unit numbers correspond to one or more channels of the plurality of channels, such that the processing unit will not store the corresponding quantity of the channel data, for each corresponding channel of the plurality of channels, at a location in the memory that is currently storing any channel data that has not yet been output or processed.

20 Claims, 15 Drawing Sheets

(56) References Cited

U.S. PATENT DOCUMENTS

| | | |
|---|---|---|
| 2007/0171830 A1 | 7/2007 | Vulkan et al. |
| 2009/0113153 A1* | 4/2009 | Yamamoto et al. ............ 711/162 |
| 2009/0219892 A1* | 9/2009 | Kim et al. ..................... 370/332 |
| 2010/0100669 A1* | 4/2010 | Huang .......................... 711/103 |
| 2010/0208732 A1* | 8/2010 | Rodbro et al. ................. 370/390 |
| 2010/0232324 A1* | 9/2010 | Radunovic et al. ............ 370/277 |
| 2010/0272045 A1* | 10/2010 | Hsu ............................... 370/329 |
| 2011/0170451 A1* | 7/2011 | Bae et al. ...................... 370/253 |

* cited by examiner

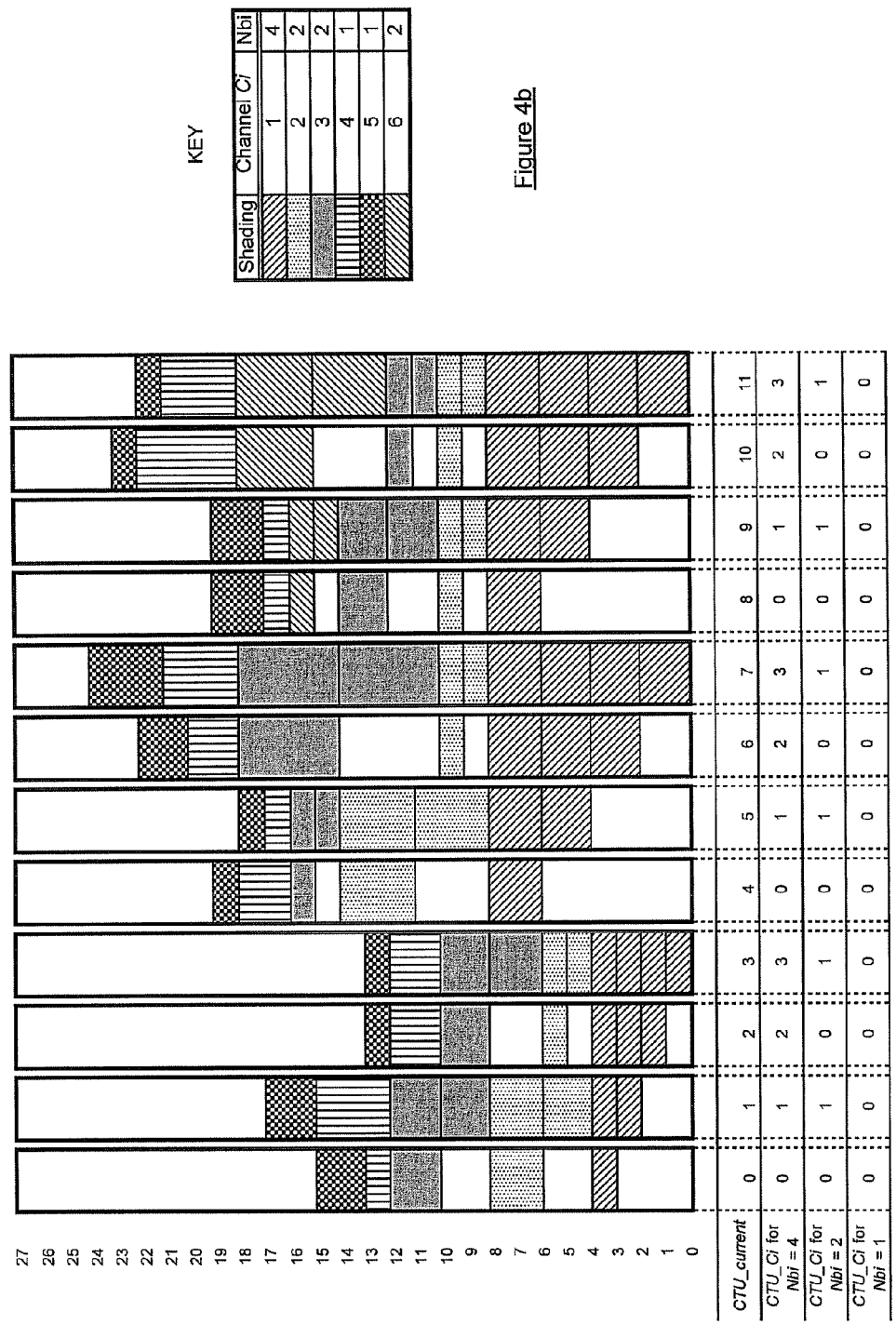

MULTIPLEXING AND DEMULTIPLEXING DATA

CROSS-REFERENCE TO RELATED APPLICATION(S)

This application is a continuation of U.S. patent application Ser. No. 12/936,965, entitled "MULTIPLEXING AND DEMULTIPLEXING DATA," filed on Oct. 8, 2010, which is a National Stage Entry under 37 C.F.R. §371 of PCT/IB2008/051651, filed Apr. 29, 2008, the disclosures of which are hereby expressly incorporated by reference in their entirety.

FIELD OF THE DISCLOSURE

The present invention relates to a method of multiplexing data, to a method of demultiplexing data, to an apparatus, to a computer program and to a data carrying medium.

BACKGROUND

Methods of multiplexing and demultiplexing data are known.

A known demultiplexer for demultiplexing channel data for a plurality of channels is described below. During each of a series of channel-time-units, the demultiplexer receives multiplexed data, for example as a multiplexed data stream. For each of the plurality of channels, a corresponding quantity of channel data for that channel is contained within the received multiplexed data. The demultiplexer then identifies the quantity of channel data for a channel and stores that channel data in a memory.

The demultiplexer divides its memory into a predetermined number of equally sized memory regions, one for each possible channel that the demultiplexer is arranged to handle. The number of channels currently being handled by the demultiplexer may be less than the maximum number of channels that the demultiplexer can handle. However, the demultiplexer divides its memory into a number of equally sized memory regions equal to this maximum number of channels to cater for the situation in which the number of channels within the multiplexed data stream increases to this maximum number of channels. The demultiplexer stores the channel data for a channel in a memory region corresponding to that channel.

For each channel, after a corresponding number of channel-time-units has passed, the channel data stored in the memory for that channel is processed. Once the channel data stored in the region of the memory associated with a channel has been processed, then that memory region is free for re-use, i.e. that memory region can be re-used to store subsequently demultiplexed channel data for that channel or for other channels.

A known multiplexer for multiplexing channel data for a plurality of channels is described below. During each of a series of channel-time-units, the multiplexer outputs multiplexed data, for example as a multiplexed data stream. For each of the plurality of channels, a corresponding quantity of channel data for that channel is contained within the output multiplexed data. The multiplexer stores channel data for each of the channels in a memory. During each of the series of channel-time-units, the multiplexer identifies a quantity of channel data for a channel to output from the channel data being stored in the memory for that channel.

The multiplexer divides the memory into a predetermined number of equally sized memory regions, one for each possible channel that the multiplexer is arranged to handle. The number of channels currently being handled by the multiplexer may be less than the maximum number of channels that the multiplexer can handle. However, the multiplexer divides its memory into a number of equally sized memory regions equal to this maximum number of channels to cater for the situation in which the number of channels that it is to handle increases to this maximum number of channels. The multiplexer stores the channel data for a channel in the memory region corresponding to that channel.

For each channel, after a corresponding number of channel-time-units has passed, the multiplexer stores fresh channel data in the memory for that channel. During the next corresponding number of channel-time-units for that channel, this fresh channel data will be output as one or more quantities of channel data within the output multiplexed data. At the end of the next corresponding number of channel-time-units for that channel, all of the fresh channel data will have been output, so that the memory region for that channel is then free, i.e. the multiplexer can then re-use that memory region to store a new amount of channel data for that channel or for other channels.

SUMMARY

According to aspects of the invention, there is provided a method, an apparatus, a computer program and a data carrying medium as described in the appended claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which:

FIGS. 4a-4d schematically illustrate the processing performed for FIG. 2 for various demultiplexing embodiments of the invention.

DETAILED DESCRIPTION OF THE DRAWINGS

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader scope of the invention as set forth in the appended claims.

Figure 1:
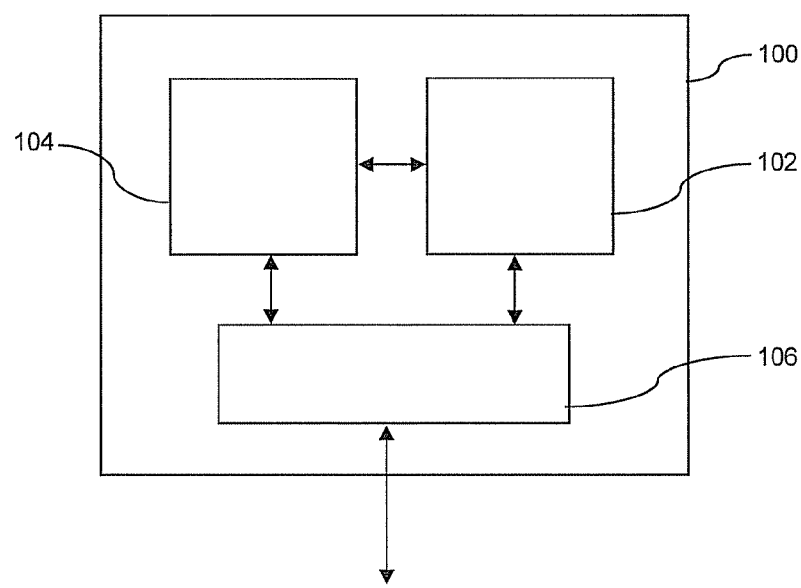
FIG. 1 schematically illustrates an apparatus according to an example of an embodiment of the invention.

FIG. 1 schematically illustrates an example of an apparatus 100 according to an embodiment of the invention. The apparatus comprises a processing unit 102, a memory 104 and an interface 106.

The apparatus 100 is arranged to perform multiplexing and/or demultiplexing of data, as will be described in more detail below. The apparatus 100 may be any device for which multiplexing and/or demultiplexing of data is desirable or required. For example, the apparatus 100 may be: a mobile or portable telephone; a personal computer; a personal digital assistant; a node in a communications network; a component part (or element) of one of these devices, etc.

The apparatus 100 is arranged to perform its multiplexing and/or demultiplexing for a plurality of channels, each channel having corresponding channel data. These channels may be of one or more channel types, such as voice channels, video channels and data channels, although it will be appreciated that other types of channels having channel data may also be used. A channel may be considered to be a flow of corresponding channel data from a source to a destination. The plurality of channels may be multiplexed together for transport across a communications network, and then demultiplexed upon arrival at a destination.

The interface 106 may be arranged to receive multiplexed data that comprises the channel data for the plurality of channels. For example, when the apparatus 100 is a mobile telephone, the multiplexed data may be received from a mobile telephone network base-station (not shown in FIG. 1) or another mobile telephone. As will be described later, the processing unit 102 is arranged to demultiplex the received multiplexed data into separate channel data for the respective channels. The processing unit 102 is arranged to then store the channel data in the memory 104 for each of the plurality channels. As described in more detail later, the processing unit 102 may then perform subsequent processing on the channel data stored in the memory 104.

Additionally, or alternatively, the interface 106 may be arranged to output multiplexed data that comprises channel data for the plurality of channels. For example, when the apparatus 100 is a mobile telephone, the multiplexed data may be transmitted to a mobile telephone network base-station (not shown in FIG. 1) or another mobile telephone. The apparatus 100 may generate and output the channel data for the plurality of channels as multiplexed data via the interface 106. As will be described later, the processing unit 102 is arranged to store channel data for the respective channels in the memory 104. The processing unit 102 is arranged to then multiplex some or all of this stored channel data together to form the multiplexed data to be output via the interface 106.

It will be appreciated that the apparatus 100 may be configured to only perform the above data multiplexing (so that it does not perform data demultiplexing), or to only perform the above data demultiplexing (so that it does not perform data multiplexing), or to perform both the above data multiplexing and data demultiplexing.

The memory 104 may be any kind of memory suitable for storing data, such as one or more of a random-access-memory, a solid-state memory, a flash memory, registers, etc.

The processing unit 102 may be any kind of processing unit which, when configured (as described below) is capable of carrying out the multiplexing and/or demultiplexing according to embodiments of the invention. The processing unit 102 may be, for instance, in the form of a field-programmable-gate-array, an application-specific-integrated-circuit (ASIC), a digital-signal-processor, etc., or any combination thereof.

The processing unit 102 may for instance be a generic processor that has been configured to carry out a multiplexing or demultiplexing method. The processing unit 102 may for example be capable of executing computer program instructions which, when executed, carry out a method according to an embodiment of the invention. Such computer program instructions may be stored on a storage medium (such as a CD-ROM, a DVD-ROM, a BluRay disk, or flash-memory device, other memory device) or may be transmitted to the device 100 over a network. In this way, the device 100 may be configured with the computer program instructions to carry out embodiments of the invention. Alternatively, the processing unit 102 may be a dedicated processing unit specifically designed to carry out embodiments of the invention, e.g., implemented as a ASIC or other dedicated circuitry.

The interface 106 may be any interface suitable for transmitting and/or receiving data. Many such interfaces are known and, for the sake of brevity, the interface shall not be described in more detail herein.

In the following, the various channels that the apparatus 100 is currently handling (either for multiplexing or demultiplexing) shall be referred to as channels $C_i$ for $i=1, 2, \ldots N_c$, where $N_c$ is the number of currently active channels. As will be discussed later, the value of $N_c$ may vary over time, i.e. channels may be added (or activated) or removed (or deactivated) at different points in time. However, the apparatus 100 may impose an upper bound, K, on the value of $N_c$, so that, when multiplexing or when demultiplexing, the apparatus 100 can handle at most K (active) channels at any one time.

As will be described in more detail below, the apparatus 100 operates based on a series of channel-time-units (CTUs), so that certain actions or processing are performed for each of the channels during a CTU. A CTU may be any predetermined period of time, such as 1 ms or 2 ms, although it will be appreciated that the length of a CTU may be set according to the particular data processing requirements and/or the data processing abilities of the apparatus 100. The series of CTUs is thus a contiguous sequence of consecutive regular periods (or durations) of time.

When multiplexing data, during each CTU the interface 106 outputs, for each of the channels, a corresponding quantity (or amount or block) of channel data that is currently stored in the memory 104 to form part of the output multiplexed data. When demultiplexing data, during each CTU the interface 106 receives, for each of the channels, a corresponding quantity (or amount or block) of channel data as part of the received input multiplexed data, which is then stored in the memory 104 during that CTU.

Each of the channels has a corresponding CTU-processing-number, the purpose of which is described in more detail below. The CTU-processing-number for the i-th channel $C_i$ shall be represented by $Nb_i$, for $i=1 \ldots N_c$. The CTU-processing-number $Nb_i$ for the i-th channel $C_i$ for multiplexing purposes may be the same as, or may be different from, the CTU-processing-number $Nb_i$ for the i-th channel $C_i$ for demultiplexing purposes. However, as multiplexing and demultiplexing are treated separately below, the distinction between the CTU-processing-number $Nb_i$ for multiplexing purposes and the CTU-processing-number $Nb_i$ for demultiplexing purposes shall not be emphasized herein and shall, instead, simply be clear from the context of the description.

In the examples that follow, it is assumed, for integers i and j with $1 \leq i, j \leq N_c$, that if $Nb_i$ is greater than $Nb_j$, then $Nb_i$ is a positive integer multiple of $Nb_j$. As will become evident, this helps align the processing for the plurality of channels during the multiplexing and demultiplexing. However, it will appreciated that the values for $Nb_i$ for $i=1 \ldots N_c$ need not necessarily follow this criterion.

The largest value of $Nb_i$ shall be referred to as $Nb_{max}$. The apparatus 100 may impose an upper bound on $Nb_{max}$, so that none of the channels may have a corresponding CTU-processing-number larger than this upper bound threshold. In some embodiments, the values of $Nb_i$ may then be constrained so that $Nb_{max}$ is always an integer multiple of $Nb_i$.

The purpose of the CTU-processing-number $Nb_i$ for the i-th channel $C_i$ is as follows. When demultiplexing received input multiplexed data that comprises channel data for the plurality of channels, the processing unit 102 will process (or make use of) the channel data that has been received and stored in the memory 104 for the i-th channel $C_i$ when $Nb_i$ CTUs have passed since the processing unit 102 last processed channel data stored in the memory 104 for that i-th channel $C_i$. Thus, as a quantity of channel data for the i-th channel $C_i$ is received every CTU, then, every $Nb_i$-th CTU, the processing unit 102 performs processing on the most recently received $Nb_i$ quantities of channel data for the channel $C_i$. The processing unit 102 will then be ready to receive a further $Nb_i$ quantities of data for the channel $C_i$ during the next $Nb_i$ CTUs.

This processing of the channel data could involve presenting the channel data to a user (such as outputting audio data, video data, graphics data, or text data). This processing of the channel data could involve copying the channel data to a different area of the memory 104, or to a different memory, that is not being used for the demultiplexing processing. Additionally, this processing of the channel data could involve data de-compression, data compression, data encryption, data decryption, etc. Furthermore, (such in 3GPP UMTS communications), the processing of the channel data may involve transport channel processing, such as de-interleaving the channel data, de-rate-matching the channel data, error correction decoding (such as Viterbi- or turbo-decoding), etc. It will be appreciated, though, that this processing of the channel data may involve some or all of the above-mentioned processing, as well as other types of processing.

When multiplexing channel data for the plurality of channels to form output multiplexed data, the processing unit 102 will store $Nb_i$ quantities of channel data to be output for the i-th channel $C_i$ in the memory 104 when $Nb_i$ CTUs have passed since the processing unit 102 last stored channel data in the memory 104 for output for the i-th channel $C_i$. Thus, every $Nb_i$-th CTU, the processing unit 102 stores $Nb_i$ quantities of channel data in the memory 104 for the channel $C_i$. As a quantity of channel data for the i-th channel $C_i$ is output from the memory 104 every CTU during the multiplexing operation, then, every $Nb_i$-th CTU, the processing unit 102 will have output the $Nb_i$ quantities of data that it initially stored in the memory 104, and will be ready to store a further $Nb_i$ quantities of data for that channel, ready for subsequent multiplexing.

Thus, the value of $Nb_i$ for channel $C_i$ may for example be determined by how often a channel produces data for outputting and/or how much data can be multiplexed per CTU. Similarly, in some demultiplexing embodiments, the value of $Nb_i$ for channel $C_i$ may be determined by how often the processing unit 102 must process data for that channel (e.g. how often audio data must be processed and output to maintain a coherent audio output to a user, or how much data is required in order to be able to perform processing such as de-interleaving, de-rate-matching, error correction decoding, encryption or decryption, compression or decompression, etc.) and/or how much data is received per CTU.

The processing for each channel $C_i$ is essentially repeated every $Nb_i$ CTUs (albeit on different data). If the index for the current CTU in the series of CTUs is CTU_current (where CTU_current starts at 0 and increases by 1 for each CTU that passes) then the index of the current CTU for the channel $C_i$ in the repeated series of $Nb_i$ CTUs, referred to as CTU_$C_i$, is calculated as CTU_$C_i$=CTU_current modulo $Nb_i$. Thus CTU_$C_i$ lies in the range from 0 to $Nb_i-1$. A sequence of consecutive CTUs as CTU_$C_i$ runs from 0 to $Nb_i-1$ shall be referred to as a CTU-processing-cycle for the channel $C_i$.

For example, for the channel $C_i$ the processing unit 102 is arranged to store $Nb_i$ quantities of channel data in the memory 104 when CTU_$C_i$ is 0, and is then arranged to output a respective one of these quantities of channel data at each CTU as CTU_$C_i$ ranges from 0 to $Nb_i-1$. However, it will be appreciated that, in other embodiments of the invention, the $Nb_i$ quantities of channel data may be stored in the memory 104 when CTU_$C_i$ assumes a predetermined value other than 0.

In an example, for the channel $C_i$, the processing unit 102 is arranged to store a respective quantity of channel data in the memory 104 at each CTU as CTU_$C_i$ ranges from 0 to $Nb_i-1$, and is then arranged to performing its processing on $Nb_i$ quantities of channel data stored in the memory 104 for the channel $C_i$ when CTU_$C_i$ is $Nb_i-1$. However, it will be appreciated that, in other embodiments of the invention, the $Nb_i$ quantities of channel data stored in the memory 104 may be processed by the processing unit 102 when CTU_$C_i$ assumes a predetermined value other than $Nb_i-1$.

For example, the size of a quantity of data for the i-th channel $C_i$ may be a corresponding value $Sz_i$. The value of $Sz_i$ may remain fixed for the entire duration of time that the channel $C_i$ is active, so that each quantity of data for the channel $C_i$ is of the size $Sz_i$. Alternatively, the processing unit 102 may be arranged to update the value of $Sz_i$. The processing unit 102 may be constrained to only update the value of $Sz_i$ when the value of CTU_$C_i$ is 0, so that, during a CTU-processing-cycle for the channel $C_i$, the value of $Sz_i$ at each of the CTUs in that CTU-processing-cycle is constant. For some multiplexing embodiments, the value of $Sz_i$ may be updated during a CTU-processing-cycle before the $Nb_i$ quantities of channel data are stored in the memory 104 for that CTU-processing-cycle; for some demultiplexing embodiments, the value of $Sz_i$ may be updated during a CTU-processing-cycle before the first quantity of channel data is stored in the memory 104 for that CTU-processing-cycle. The description that follows will be described with reference to these embodiments. However, it will be appreciated that the processing unit 102 could be arranged to update $Sz_i$ for the channel $C_i$ at any stage, and that the equations given later would simply need to be updated to cater for corresponding changes to the value $Sz_i$, as opposed to assuming that $Sz_i$ is fixed for a CTU-processing-cycle for the channel $C_i$.

Additionally, the processing unit 102 may be arranged to update the value of $Nb_i$ for the i-th channel $C_i$. To help keep the multiplexing and demultiplexing of the plurality of channels synchronised, some embodiments only permit the processing unit 102 to update the value of $Nb_i$ for the i-th channel $C_i$ when CTU_current modulo $Nb_{max}$ equals 0. In some embodiments in which an upper bound B is imposed on $Nb_{max}$, this update may only be permitted when CTU_current modulo B equals 0. For some multiplexing embodiments, the value of $Nb_i$ may be updated during a CTU-processing-cycle before the $Nb_i$ quantities of channel data are stored in the memory 104 for that CTU-processing-cycle; for some demultiplexing embodiments, the value of $Nb_i$ may be updated during a CTU-processing-cycle before the first quantity of channel data is stored in the memory 104 for that CTU-processing-cycle. In such embodiments in which additionally, for integers i and j with $1 \leq i, j \leq N_c$, if $Nb_i$ is greater than $Nb_j$ then $Nb_i$ is a positive integer multiple of $Nb_j$, then limiting the update of the value of $Nb_i$ in this way ensures that the value of $Nb_i$ is only updated when each of the channels is starting a respective CTU-processing-cycle. Additionally, in such embodiments in which additionally an upper bound is placed on $Nb_{max}$ and each $Nb_i$ is a positive integer multiple of $Nb_{max}$, then limiting the update of the value of $Nb_i$ in this way ensures that the value of $Nb_i$ is only updated when each of the channels is starting a respective CTU-processing-cycle.

Additionally, the processing unit 102 may be arranged to add (or activate) or remove (or deactivate) a channel (i.e. update the value of $N_c$). To help keep the multiplexing and demultiplexing of the plurality of channels synchronised, some embodiments only permit the processing unit 102 to update the value of $N_c$ when CTU_current modulo $Nb_{max}$ equals 0. In some embodiments in which an upper bound B is imposed on $Nb_{max}$, this update may only be permitted when CTU_current modulo B equals 0. In embodiments in which, for integers i and j with $1 \leq i, j \leq N_c$, if $Nb_i$ is greater than $Nb_j$ then $Nb_i$ is a positive integer multiple of $Nb_j$, then limiting the update of the value of $N_c$ in this way ensures that the value of $N_c$ is only updated when each of the channels is starting a respective CTU-processing-cycle. Additionally, in such embodiments in which additionally an upper bound is placed on $Nb_{max}$ and each $Nb_i$ is a positive integer multiple of $Nb_{max}$, then limiting the update of the value of $Nb_i$ in this way ensures that the value of $Nb_i$ is only updated when each of the channels is starting a respective CTU-processing-cycle.

The processing unit 102 may be arranged to determine, for each of the channels, a respective region of the memory 104 to associate with that channel. The processing unit 102 may have allocated (or reserved) an area of the memory 104 for the multiplexing or demultiplexing processing, in which case the memory regions determined for the channels are regions of the allocated area of the memory 104. A memory region is a contiguous area of the memory 104 (i) for storing channel data to be multiplexed (for multiplexing embodiments) or (ii) for storing channel data that has been demultiplexed (for demultiplexing embodiments).

To do this, the processing unit 102 does not simply divide the memory 104 into $N_c$, or even K, memory regions of the same predetermined size, one for each of the channels, as per the above-described known methods for multiplexing and demultiplexing. Instead, when the processing unit 102 associates regions of the memory 104 with the channels, it determines the locations for those regions within the memory 104 based on some or all of the CTU-processing-numbers $Nb_i$ and some or all of the size values $Sz_i$ for the channels. In other words, the processing unit 102 determines the start addresses in the memory 104 for respective contiguous memory regions that are to be associated with respective ones of the plurality of channels, and these start addresses are determined based on some or all of the CTU-processing-numbers $Nb_i$ and some or all of the size values $Sz_i$ for the channels. The size of the contiguous memory region for the channel $C_i$ is then determined by the size value $Sz_i$ and the CTU-processing number $Nb_i$. In particular, if $Sz_i$ is constant during a CTU-processing-cycle, then the size of the memory region is $Sz_i \times Nb_i$.

For multiplexing embodiments, the processing unit 102 determines the locations of the memory regions in such a way that the processing unit 102 will not store channel data for a channel at a location in the memory 104 that is currently storing channel data that has not yet been output by the processing unit 102 as part of the output multiplexed data. For demultiplexing embodiments, the processing unit 102 determines the locations of the memory regions in such a way that the processing unit 102 will not store received channel data for a channel at a location in the memory 104 that is currently storing received channel data that has not yet been processed by the processing unit 102. This is explained in more detail below.

The processing unit 102 is arranged to update the locations of the memory regions associated with the plurality of channels. Such updating is desirable as it can take account of: changes to the values of some or all of the CTU-processing-numbers $Nb_i$; changes to the values of some or all of the size values $Sz_i$; and changes to the number of active channels, $N_c$. In this way, the processing unit 102 ensures that channel data for one of the channels is never stored in the memory 104 by overwriting channel data that is being stored for another channel and that has yet to be used (either output via multiplexing or processed for demultiplexing).

The processing performed by the processing unit 102 to determine and update the memory regions associated with the channels also helps reduce the fragmentation of the memory 104. As will be illustrated in more detail below, the memory regions associated with the plurality of channels may together be contiguous in the memory 104. Thus, the most efficient usage of the memory 104 is achieved. This arrangement then allows for one or more of: an increase in the maximum number K of channels that can be processed; an increase in the size values $Sz_i$; an increase in the CTU-processing-numbers $Nb_i$; a decrease in the probability of overflowing the memory 104 with channel data; and decreasing the size of the memory 104 (or the size of the area of memory allocated for the multiplexing or demultiplexing) for a given predetermined probability of overflowing the memory 104 (or allocated memory area).

The memory region associated with the i-th channel $C_i$ remains constant during the CTU-processing-cycle for the channel $C_i$. Thus, the larger the value of a CTU-processing-number $Nb_i$ for a channel $C_i$, the longer the memory region associated with that channel $C_i$ will remain the same before being updated. Hence, some embodiments process the channels in order of decreasing CTU-processing-number for the channels, so that channels whose memory region locations are the same for longer are processed first, and channels whose memory region locations can be changed more often are processed later, so that such memory regions can be more easily fitted in the memory 104 around other memory regions.

Figure 2:
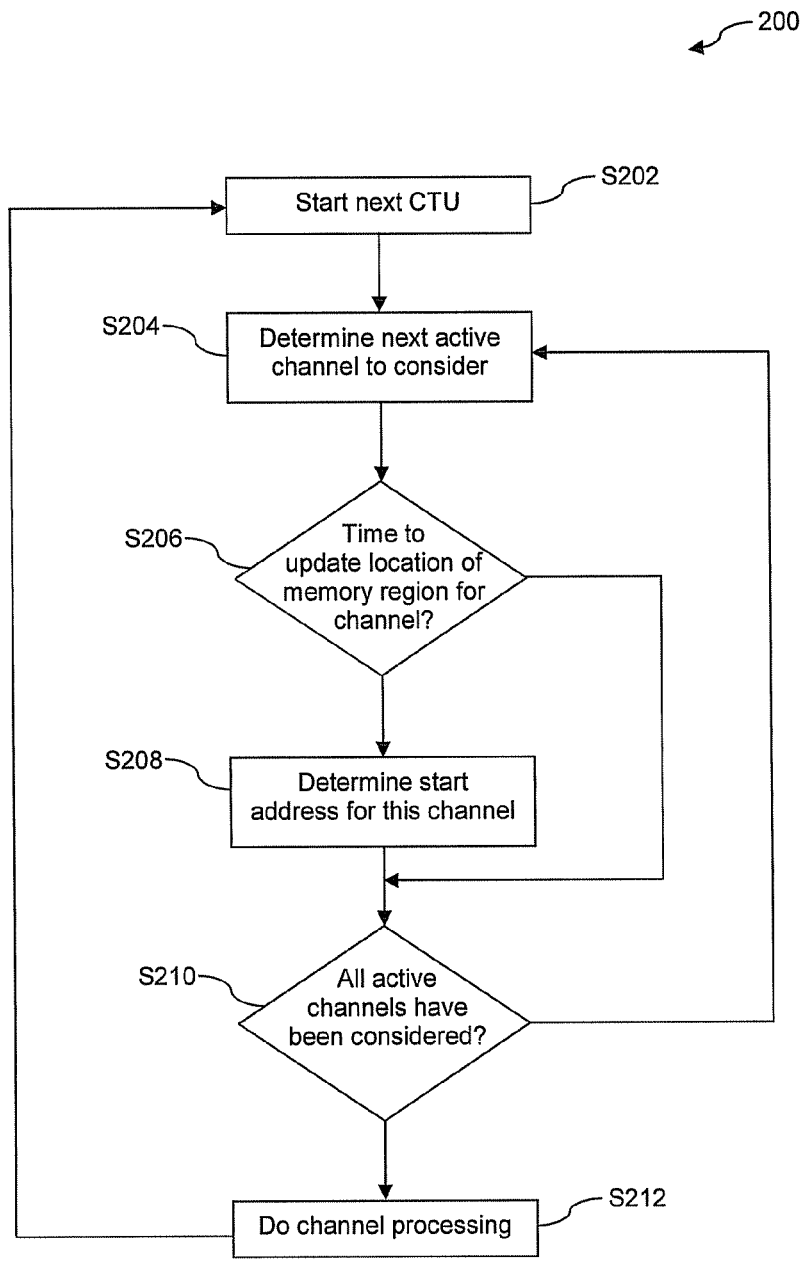
FIG. 2 is a schematic flowchart illustrating high-level processing for multiplexing and demultiplexing embodiments of the invention.

FIG. 2 is a schematic flowchart illustrating the high-level processing 200 for multiplexing and demultiplexing embodiments of the invention. Specific embodiments of the FIG. 2 flowchart will be described later.

At a step S202, the processing for the next CTU begins. Thus, the value of CTU_current is incremented by 1 (to reflect the fact that a new CTU is about to begin). Additionally, updating CTU_current means that the value of the index CTU_$C_i$ of the current CTU for the channel $C_i$ in the CTU-processing-cycle for the channel $C_i$ is also updated according to the formula given above.

Additionally, as mentioned above, at the beginning of a CTU: one or more size values $Sz_i$ may be updated; one or more CTU-processing-numbers $Nb_i$ may be updated; one or more channels may be added (or become active); and one or more channels may be removed (or become deactivated). As discussed above, there may be restrictions on the CTUs during which such updates can occur.

At a step S204, the processing unit 102 determines the next active channel to be considered during this CTU, i.e. which channel is the next active channel that the processing unit 102 will inspect to determine whether or not to update the location of its associated memory region. As mentioned above, in some embodiments, the channels are processed in order of decreasing CTU-processing-number, so that at the step S204, the processing unit 102 selects a channel out of the channels that have not been considered yet during this CTU that has the highest value of $Nb_i$. However, in another embodiment of the invention, the processing unit 102 may simply select the channels in their currently indexed order, i.e. in the order $C_1$, $C_2$, . . . .

At a step S206, the processing unit 102 determines whether it is now time to update the location of the region in the memory 104 associated with the channel identified at the step S204. This will be described in more detail later with respect to a number of example embodiments. If it is now time to update the location of the region in the memory 104 associated with that channel, then processing continues at a step S208; otherwise, processing continues at a step S210.

At the step S208, the processing unit 102 determines a new start address for the region in the memory 104 associated with the identified channel. Thus, the processing unit 102 updates the location of the region in the memory 104 associated with the identified channel. It will be appreciated that the new start address may actually be the same as the current start address for that region in the memory 104, so that the update of the start address does not change the start address. Processing then continues at the step S210.

At the step S210, it is determined whether all of the active channels have now been considered during the processing 200 for the current CTU, i.e. whether the processing unit 102 has inspected each of the current channels during this CTU to determine whether or not to update its corresponding memory region. If so, then processing continues at a step S212; otherwise, processing returns to the step S204.

At the step S212, the processing unit 102 performs the relevant multiplexing or demultiplexing processing on the channels. As described above, for multiplexing data, the processing at the step S212 involves, for each of the channels (i) potentially storing a fresh amount of channel data in the memory region associated with that channel and (ii) outputting a quantity of channel data from the memory region associated with that channel. Additionally, as described above, for demultiplexing data, the processing at the step S212 involves, for each of the channels (i) storing a quantity of channel data in the memory region associated with that channel and (ii) potentially processing all of the channel data stored in the memory region associated with that channel.

FIGS. 3a-3d schematically illustrate the processing performed at the steps S206 and S208 of FIG. 2 during multiplexing processing of various embodiments of the invention. FIGS. 4a-4d schematically illustrate the processing performed at the steps S206 and S208 of FIG. 2 during demultiplexing processing of various embodiments of the invention. In each of these figures:

Six channels ($C_1$, . . . , $C_6$) are processed.

For channel $C_1$, the value of $Nb_1$ is 4 CTUs. At CTU 0, the value of $Sz_1$ is 1 kB. At CTU 4, the value of $Sz_1$ is updated to 2 kB.

For channel $C_2$, the value of $Nb_2$ is 2 CTUs. At CTU 0, the value of $Sz_2$ is 2 kB. At CTU 2, the value of $Sz_2$ is updated to 1 kB. At CTU 4, the value of $Sz_2$ is updated to 3 kB. At CTU 6, the value of $Sz_2$ is updated to 1 kB.

For channel $C_3$, the value of $Nb_3$ is 2 CTUs. At CTU 0, the value of $Sz_3$ is 2 kB. At CTU 4, the value of $Sz_3$ is updated to 1 kB. At CTU 6, the value of $Sz_3$ is updated to 4 kB. At CTU 8, the value of $Sz_3$ is updated to 2 kB. At CTU 10, the value of $Sz_3$ is updated to 1 kB.

For channel $C_4$, the value of $Nb_4$ is 1 CTU. At CTU 0, the value of $Sz_4$ is 1 kB. At CTU 1, the value of $Sz_4$ is updated to 3 kB. At CTU 2, the value of $Sz_4$ is updated to 2 kB. At CTU 5, the value of $Sz_4$ is updated to 1 kB. At CTU 6, the value of $Sz_4$ is updated to 2 kB. At CTU 7, the value of $Sz_4$ is updated to 3 kB. At CTU 8, the value of $Sz_4$ is updated to 1 kB. At CTU 10, the value of $Sz_4$ is updated to 4 kB. At CTU 11, the value of $Sz_4$ is updated to 3 kB.

For channel $C_5$, the value of $Nb_5$ is 1 CTU. At CTU 0, the value of $Sz_5$ is 2 kB. At CTU 2, the value of $Sz_5$ is updated to 1 kB. At CTU 6, the value of $Sz_5$ is updated to 2 kB. At CTU 7, the value of $Sz_5$ is updated to 3 kB. At CTU 8, the value of $Sz_5$ is updated to 2 kB. At CTU 10, the value of $Sz_5$ is updated to 1 kB.

At CTU 8, a new channel $C_6$ with CTU-processing-number $Nb_6$ of 2 CTUs is introduced. At CTU 8, the value of $Sz_6$ is 1 kB. At CTU 10, the value of $Sz_6$ is updated to 3 kB.

The embodiments shown in FIGS. 3a-3d and 4a-4d are embodiments in which, when updating the memory regions associated with the channels, the processing unit 102 considers the channels in decreasing order of CTU-processing-number, i.e. if channel $C_i$ has a larger CTU-processing-number $Nb_i$ than the CTU-processing-number $Nb_j$ of a different channel $C_j$, then the channel $C_i$ is selected at the step S204 of FIG. 2 before the channel $C_j$.

For ease of notation, the i-th channel determined at the step S204 will be referred to as channel $C_{p(i)}$, so that the channels undergo the processing of the step S206 (and potentially the step S208 too) in the order $C_{p(1)}$, $C_{p(2)}$, . . . . Thus, for CTUs 0-7 in FIGS. 3a-3d and 4a-4d, p(i)=i; whereas, due to the introduction of channel $C_6$ at CTU 8, for CTUs 8-11 in FIGS. 3a-3d and 4a-4d, p(i)=i for i=1 . . . 3, p(4)=6, p(5)=4 and p(6)=5.

It will be appreciated that, (i) when demultiplexing channel data from received multiplexed data, the channel data need not be present in the multiplexed data in the same order as the order in which the channels are to be processed, i.e. the channel data within the multiplexed data need not be in the order $C_{p(1)}$, $C_{p(2)}$, . . . ; and (ii) for multiplexing channel data, the channel data need not be present in the output multiplexed data in the same order as the order in which the channels are to be processed, i.e. the channel data within the output multiplexed data need not be in the order $C_{p(1)}$, $C_{p(2)}$, . . . .

It will be appreciated that other configurations of channels, with different numbers of channels, different size values $Sz_i$, different CTU-processing-numbers $Nb_i$, etc. could be implemented and realized in practice.

In FIGS. 3a-3d and 4a-4d, each column represents the memory 104. The memory 104 is shown with a base address B equal to 0 for convenience (although it will be appreciated that the base address B may be any suitable base address from which the processing unit 102 may use memory for the multiplexing and demultiplexing). Furthermore, the scale on the left hand side of the figures is memory location in increasing steps of 1 kB from the base address B. However, it will be appreciated that the size of the memory 104 may be smaller or larger than that shown in FIGS. 3a-3d and 4a-4d, and that quantities of channel data may be stored in the memory 104 in blocks at resolutions other than 1 kB, i.e. a quantity of channel data does not have to be an integer number of kB.

In the descriptions that follow, for each of the channels $C_i$ (for i=1 . . . $N_c$), the starting address for the contiguous region of the memory 104 to associate with the channel $C_i$ shall be designated as $S_i$. The memory region associated with channel $C_i$ thus starts at the starting address $S_i$ and is a contiguous block of the memory 104 of size $Sz_i \times Nb_i$.

1) Multiplexing Channel Data

In FIGS. 3a-3d, each column represents the memory 104, or at least the area of the memory 104 that has been allocated by the processing unit 102 for storing channel data before it is multiplexed by the processing unit 102. FIGS. 3a-3d depict the situation at a sequence of 12 CTUs. For each of these CTUs, FIGS. 3a-3d depict the situation just before the processing unit 102 is about to output a quantity of channel data for each of the channels during that CTU. Shaded parts of the memory 104 are parts of the memory 104 that currently store channel data for outputting as multiplexed data; non-shaded parts of the memory 104 are parts of the memory that do not currently store channel data that has yet to be output as multiplexed data.

1.1) First Multiplexing Embodiment

Figure 3A:
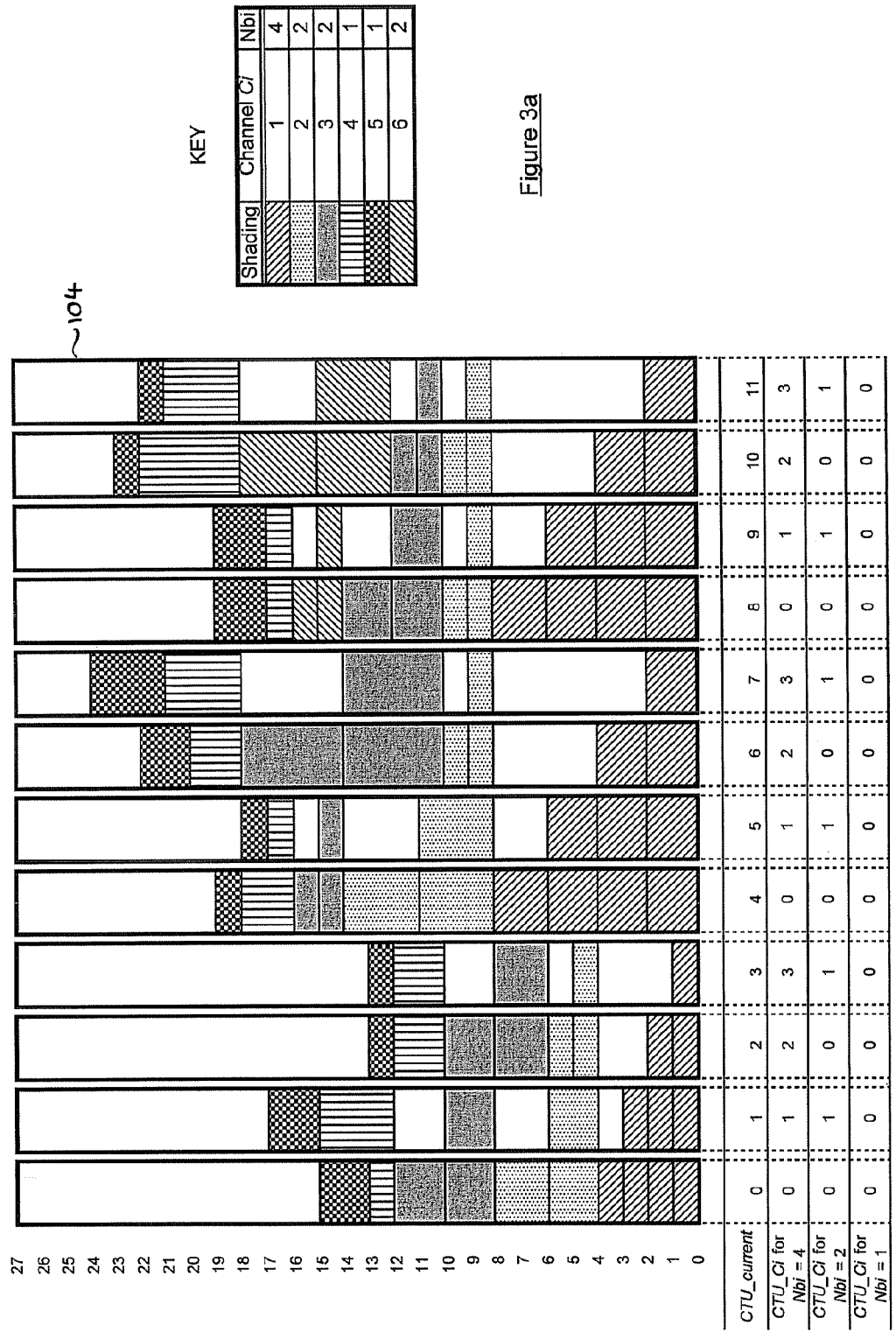
FIGS. 3a-3d schematically illustrate the processing performed for FIG. 2 for various multiplexing embodiments of the invention.

A first multiplexing embodiment of the invention is schematically illustrated in FIG. 3a. In this embodiment:

The processing for channel $C_{p(i)}$ at the step S206 of FIG. 2 is:
- If i=1, i.e. this is the first channel being considered by the processing 200 during this CTU, then it is determined that the location of the memory region for channel $C_{p(i)}$ is to be updated when CTU_$C_{p(i)}$=0 (i.e. at the beginning of a CTU-processing-cycle for channel $C_{p(i)}$); and
- If i>1, i.e. this is not the first channel being considered by the processing 200 during this CTU, then it is determined that the location of the memory region for channel $C_{p(i)}$ is to be updated when CTU_$C_{p(i-1)}$=0 (i.e. at the beginning of a CTU-processing-cycle for the preceding channel $C_{p(i-1)}$ in the processing order).

The processing for channel $C_{p(i)}$ at the step S208 of FIG. 2 is:
- If i=1, i.e. this is the first channel being considered by the processing 200 during this CTU, the start address for the memory region associated with channel $C_{p(i)}$ is set to be the base address B, i.e. $S_{p(i)}$=B; and
- If i>1, i.e. this is not the first channel being considered by the processing 200 during this CTU, the start address for the memory region for channel $C_{p(i)}$ is set such that $S_{p(i)} = S_{p(i-1)} + (Nb_{p(i-1)} \times Sz_{p(i-1)})$. Thus, the start address for the memory region for channel $C_{p(i)}$ is sufficiently away from the start address for the memory region for preceding channel $C_{p(i-1)}$ in the processing order such that storing $Nb_{p(i)}$ quantities of size $Sz_{p(i)}$ of channel data in the memory region for channel $C_{p(i)}$ does not result in storing channel data in the memory region for the preceding channel $C_{p(i-1)}$.

For the processing at the step S212 of FIG. 2, for each of the active channels $C_i$:
- when CTU_$C_i$=0 (i.e. at the beginning of the CTU-processing-cycle for channel $C_i$), the processing unit 102 stores $Nb_i$ quantities of size $Sz_i$ of channel data in the memory 104 starting at the starting address $S_i$; and
- during each CTU, the processing unit 102 outputs a quantity of size $Sz_i$ of channel data from the associated memory region, working from the end of the memory region to the start address $S_i$ of the memory region.

1.2) Second Multiplexing Embodiment

Figure 3B:
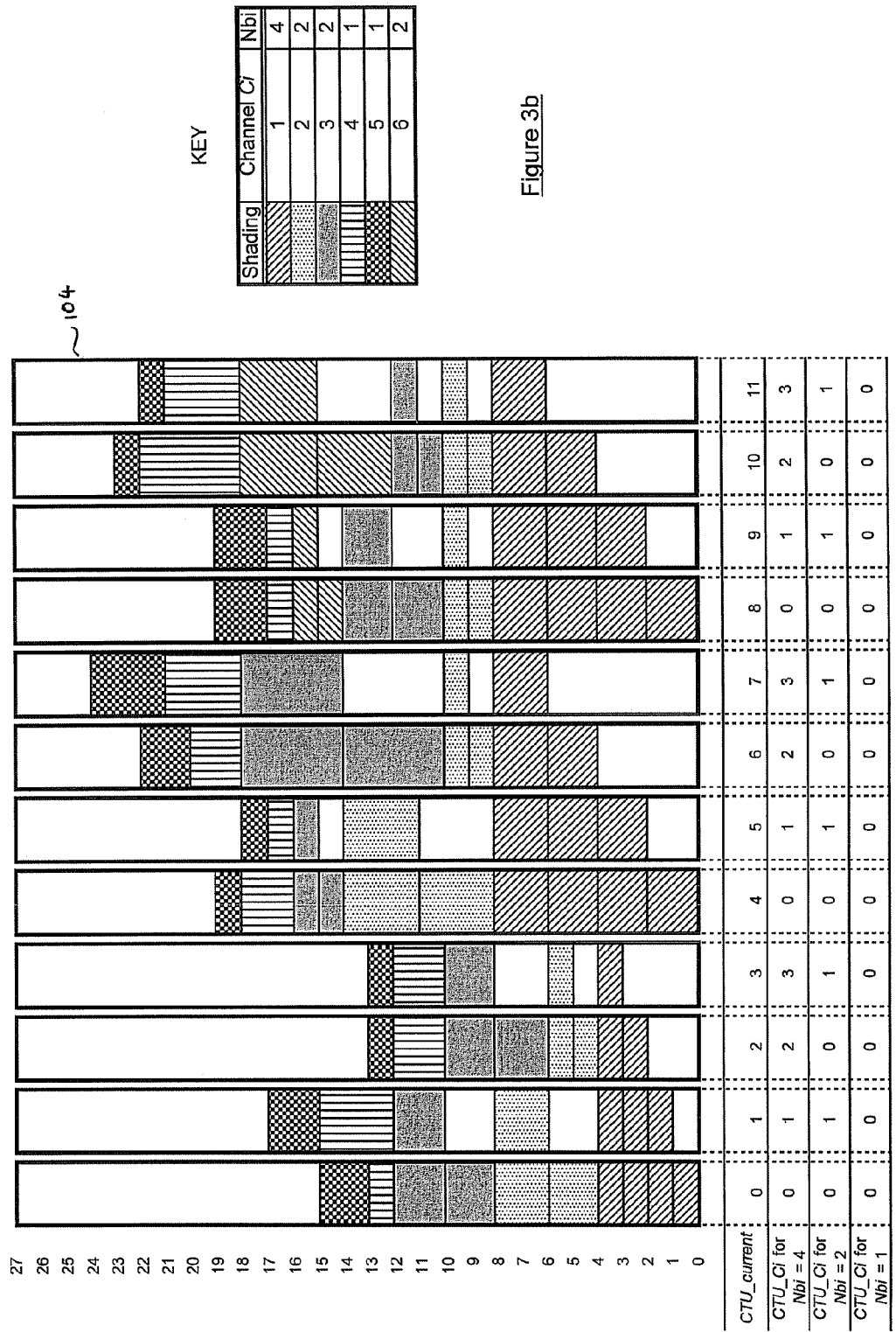

A second multiplexing embodiment of the invention is schematically illustrated in FIG. 3b. In this embodiment:

The processing for channel $C_{p(i)}$ at the step S206 of FIG. 2 is:
- If i=1, i.e. this is the first channel being considered by the processing 200 during this CTU, then it is determined that the location of the memory region for channel $C_{p(i)}$ is to be updated when CTU_$C_{p(i)}$=0 (i.e. at the beginning of a CTU-processing-cycle for channel $C_{p(i)}$); and
- If i>1, i.e. this is not the first channel being considered by the processing 200 during this CTU, then it is determined that the location of the memory region for channel $C_{p(i)}$ is to be updated when CTU_$C_{p(i-1)}$=0 (i.e. at the beginning of a CTU-processing-cycle for the preceding channel $C_{p(i-1)}$ in the processing order).

The processing for channel $C_{p(i)}$ at the step S208 of FIG. 2 is:
- If i=1, i.e. this is the first channel being considered by the processing 200 during this CTU, then the start address for the memory region associated with channel $C_{p(i)}$ is set to be the base address B, i.e. $S_{p(i)}$=B; and
- If i>1, i.e. this is not the first channel being considered by the processing 200 during this CTU, then the start address for the memory region for channel $C_{p(i)}$ is set such that $S_{p(i)} = S_{p(i-1)} + (Nb_{p(i-1)} \times Sz_{p(i-1)})$. Thus, the start address for the memory region for channel $C_{p(i)}$ is sufficiently away from the start address for the memory region for preceding channel $C_{p(i-1)}$ in the processing order such that storing $Nb_{p(i)}$ quantities of size $Sz_{p(i)}$ of channel data in the memory region for channel $C_{p(i)}$ does not result in storing channel data in the memory region for the preceding channel $C_{p(i-1)}$.

For the processing at the step S212 of FIG. 2, for each of the active channels $C_i$:
- when CTU_$C_i$=0 (i.e. at the beginning of the CTU-processing-cycle for channel $C_i$), the processing unit 102 stores $Nb_i$ quantities of size $Sz_i$ of channel data in the memory 104 starting at the starting address $S_i$; and
- during each CTU, the processing unit 102 outputs a quantity of size $Sz_i$ of channel data from the associated memory region, working from the start address $S_i$ of the memory region to the end of the memory region.

1.3) Third Multiplexing Embodiment

Figure 3C:
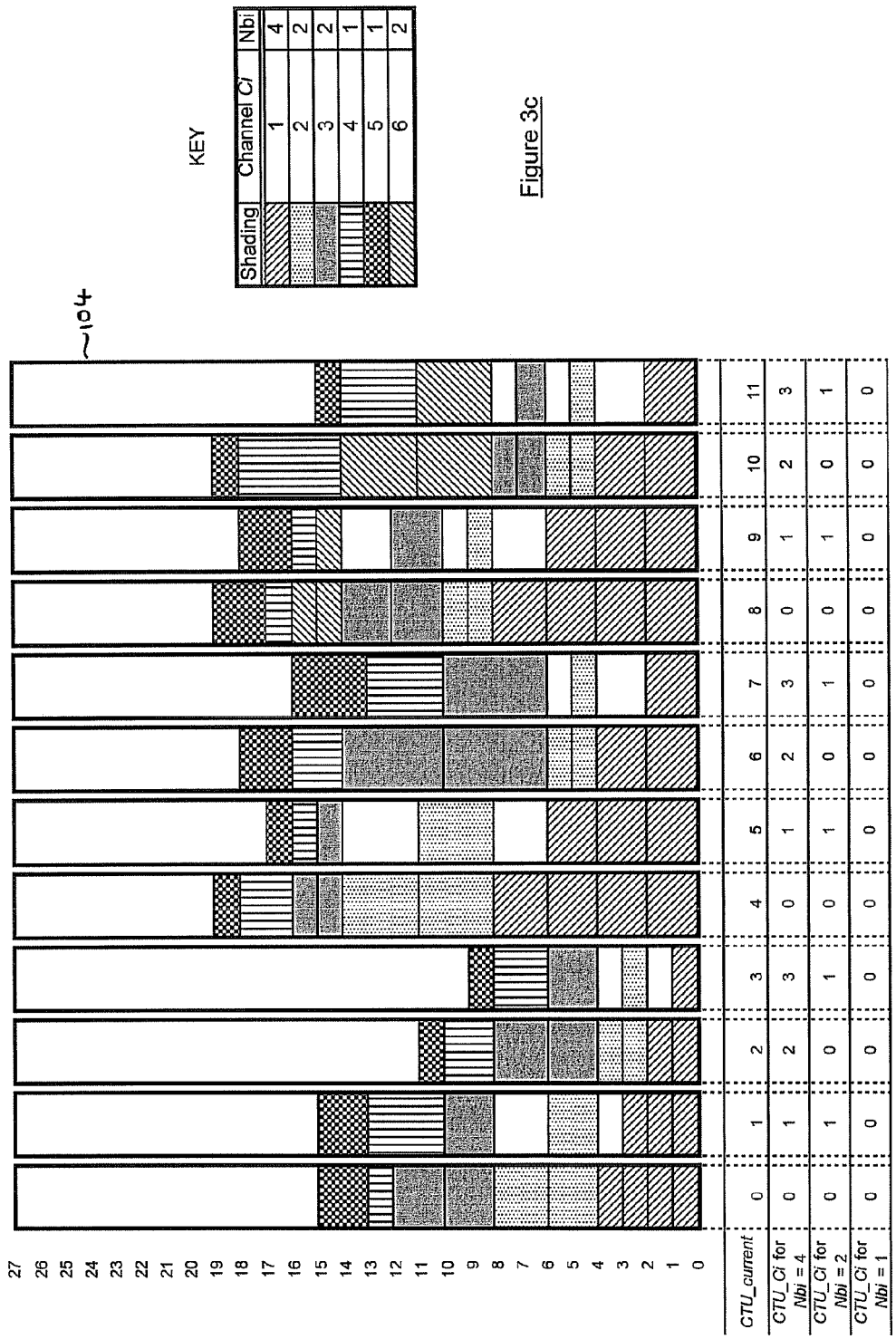

A third multiplexing embodiment of the invention is schematically illustrated in FIG. 3c. In this embodiment:

The processing for channel $C_{p(i)}$ at the step S206 of FIG. 2 determines that the location of the memory region for channel $C_{p(i)}$ is to be updated when CTU_$C_{p(i)}$=0, (i.e. at the beginning of a CTU-processing-cycle for channel $C_{p(i)}$).

The processing for channel $C_{p(i)}$ at the step S208 of FIG. 2 is:
- If i=1, i.e. this is the first channel being considered by the processing 200 during this CTU, then the start address for the memory region associated with channel $C_{p(i)}$ is set to be the base address B, i.e. $S_{p(i)}$=B; and
- If i>1, i.e. this is not the first channel being considered by the processing 200 during this CTU, then the start address for the memory region for channel $C_{p(i)}$ is set such that $S_{p(i)} = S_{p(i-1)} + ((Nb_{p(i-1)} - CTU\_C_{p(i-1)}) \times Sz_{p(i-1)})$. Thus, the start address for the memory region for channel $C_{p(i)}$ is sufficiently away from the start address for the memory region for preceding channel $C_{p(i-1)}$ in the processing order such that storing $Nb_{p(i)}$ quantities of size $Sz_{p(i)}$ of channel data in the memory region for channel $C_{p(i)}$ does not result in overwriting channel data in the memory region for the preceding channel $C_{p(i-1)}$ that has not yet been output as multiplexed data. However, channel data for the preceding channel $C_{p(i-1)}$ that has already been output as multiplexed data may be overwritten (without causing data loss or data corruption).

For the processing at the step S212 of FIG. 2, for each of the active channels $C_i$:
  when $CTU\_C_i=0$ (i.e. at the beginning of the CTU-processing-cycle for channel $C_i$), the processing unit 102 stores $Nb_i$ quantities of size $Sz_i$ of channel data in the memory 104 starting at the starting address $S_i$; and
  during each CTU, the processing unit 102 outputs a quantity of size $Sz_i$ of channel data from the associated memory region, working from the end of the memory region to the start address $S_i$ of the memory region.

1.4) Fourth Multiplexing Embodiment

Figure 3D:
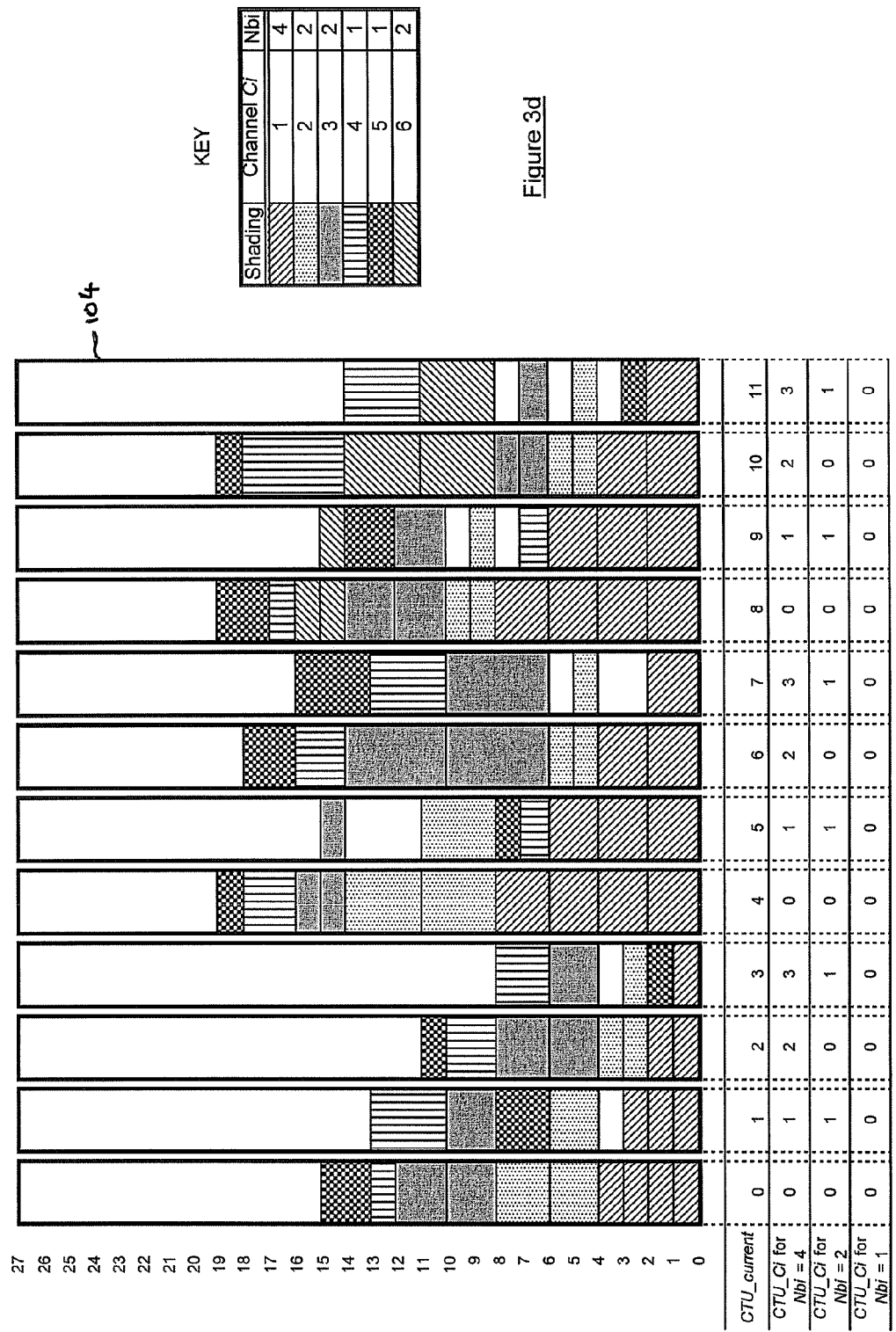

A fourth multiplexing embodiment of the invention is schematically illustrated in FIG. 3d. In this embodiment:
  The processing for channel $C_{p(i)}$ at the step S206 of FIG. 2 determines that the location of the memory region for channel $C_{p(i)}$ is to be updated when $CTU\_C_{p(i)}=0$ (i.e. at the beginning of a CTU-processing-cycle for channel $C_{p(i)}$).
  The processing for channel $C_{p(i)}$ at the step S208 of FIG. 2 is:
    If i=1, i.e. this is the first channel being considered by the processing 200 during this CTU, then the start address for the memory region associated with channel $C_{p(i)}$ is set to be the base address B, i.e. $S_{p(i)}=B$; and
    If i>1, i.e. this is not the first channel being considered by the processing 200 during this CTU, then the start address for the memory region for channel $C_{p(i)}$ is set such that:
      If $Nb_{p(i)}>1$, then $S_{p(i)}=S_{p(i-1)}+(Nb_{p(i-1)}-CTU\_C_{p(i-1)})\times Sz_{p(i-1)}$. Thus, the start address for the memory region for channel $C_{p(i)}$ is sufficiently away from the start address for the memory region for preceding channel $C_{p(i-1)}$ in the processing order such that storing $Nb_{p(i)}$ quantities of size $Sz_{p(i)}$ of channel data in the memory region for channel $C_{p(i)}$ does not result in overwriting channel data in the memory region for the preceding channel $C_{p(i-1)}$ that has not yet been output as multiplexed data. However, channel data for the preceding channel $C_{p(i-1)}$ that has already been output as multiplexed data may be overwritten (without causing data loss or data corruption).
      if $Nb_{p(i)}=1$, then $S_{p(i)}$ is set to be the first (lowest) memory address following the base address B following which there is a contiguous region of size $Sz_{p(i)}$ that does not contain channel data that has not yet been output as multiplexed data.
  For the processing at the step S212 of FIG. 2, for each of the active channels $C_i$:
    when $CTU\_C_i=0$ (i.e. at the beginning of the CTU-processing-cycle for channel $C_i$), the processing unit 102 stores $Nb_i$ quantities of size $Sz_i$ of channel data in the memory 104 starting at the starting address $S_i$; and
    during each CTU, the processing unit 102 outputs a quantity of size $Sz_i$ of channel data from the associated memory region, working from the end of the memory region to the start address $S_i$ of the memory region.

2) Demultiplexing Channel Data

In FIGS. 4a-4d, each column represents the memory 104, or at least the area of the memory 104 that has been allocated by the processing unit 102 for storing channel data that has been demultiplexed by the processing unit 102. FIGS. 4a-4d depict the situation at a sequence of 12 CTUs. For each of these CTUs, FIGS. 4a-4d depict the situation just after the processing unit 102 has stored a quantity of channel data in the memory 104 for each of the channels during that CTU. Shaded parts of the memory 104 are parts of the memory 104 that currently store channel data for subsequent processing by the processing unit 102; non-shaded parts of the memory 104 are parts of the memory that do not currently store channel data that has yet to be processed by the processing unit 102.

2.1) First Demultiplexing Embodiment

Figure 4A:
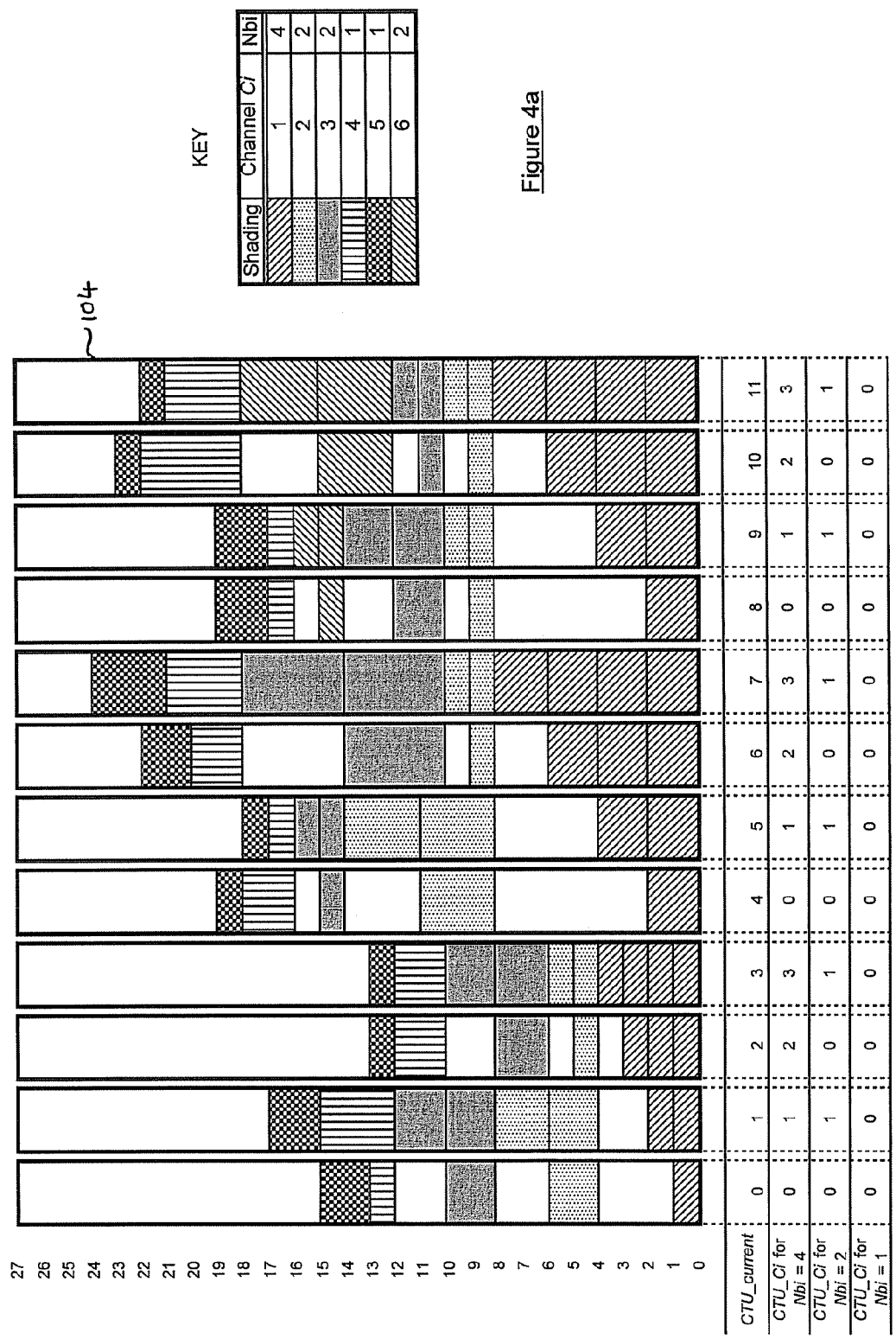

A first demultiplexing embodiment of the invention is schematically illustrated in FIG. 4a. In this embodiment:
  The processing for channel $C_{p(i)}$ at the step S206 of FIG. 2 is:
    If i=1, i.e. this is the first channel being considered by the processing 200 during this CTU, then it is determined that the location of the memory region for channel $C_{p(i)}$ is to be updated when $CTU\_C_{p(i)}=0$ (i.e. at the beginning of a CTU-processing-cycle for channel $C_{p(i)}$); and
    If i>1, i.e. this is not the first channel being considered by the processing 200 during this CTU, then it is determined that the location of the memory region for channel $C_{p(i)}$ is to be updated when $CTU\_C_{p(i-1)}=0$ (i.e. at the beginning of a CTU-processing-cycle for the preceding channel $C_{p(i-1)}$ in the processing order).
  The processing for channel $C_{p(i)}$ at the step S208 of FIG. 2 is:
    If i=1, i.e. this is the first channel being considered by the processing 200 during this CTU, then the start address for the memory region associated with channel $C_{p(i)}$ is set to be the base address B, i.e. $S_{p(i)}=B$; and
    If i>1, i.e. this is not the first channel being considered by the processing 200 during this CTU, then the start address for the memory region for channel $C_{p(i)}$ is set such that $S_{p(i)}=S_{p(i-1)}+(Nb_{p(i-1)}\times Sz_{p(i-1)})$. Thus, the start address for the memory region for preceding channel $C_{p(i-1)}$ in the processing order is sufficiently away from the start address for the memory region for current channel $C_{p(i)}$ such that storing $Nb_{p(i-1)}$ quantities of size $Sz_{p(i-1)}$ of channel data in the memory region for preceding channel $C_{p(i-1)}$ does not result in storing channel data in the memory region for the current channel $C_{p(i)}$.
  For the processing at the step S212 of FIG. 2, for each of the active channels $C_i$:
    during each CTU, the processing unit 102 stores a quantity of size $Sz_i$ of channel data in the associated memory region, working from the start address $S_i$ of the memory region to the end of the memory region; and
    when $CTU\_C_i=Nb_i-1$ (i.e. at the end of the CTU-processing-cycle for channel $C_i$), the processing unit 102 processes the $Nb_i$ quantities of size $Sz_i$ of channel data stored in the memory 104 for channel $C_i$.

2.2) Second Demultiplexing Embodiment

A second demultiplexing embodiment of the invention is schematically illustrated in FIG. 4b. In this embodiment:
  The processing for channel $C_{p(i)}$ at the step S206 of FIG. 2 is:
    If i=1, i.e. this is the first channel being considered by the processing 200 during this CTU, then it is determined that the location of the memory region for channel $C_{p(i)}$ is to be updated when $CTU\_C_{p(i)}=0$ (i.e. at the beginning of a CTU-processing-cycle for channel $C_{p(i)}$); and
    If i>1, i.e. this is not the first channel being considered by the processing 200 during this CTU, then it is determined that the location of the memory region for channel $C_{p(i)}$ is to be updated when $CTU\_C_{p(i-1)}=0$ (i.e. at the beginning of a CTU-processing-cycle for the preceding channel $C_{p(i-1)}$ in the processing order).

The processing for channel $C_{p(i)}$ at the step S208 of FIG. 2 is:
- If i=1, i.e. this is the first channel being considered by the processing 200 during this CTU, then the start address for the memory region associated with channel $C_{p(i)}$ is set to be the base address B, i.e. $S_{p(i)}$=B; and
- If i>1, i.e. this is not the first channel being considered by the processing 200 during this CTU, then the start address for the memory region for channel $C_{p(i)}$ is set such that $S_{p(i)} = S_{p(i-1)} + (Nb_{p(i-1)}) \times Sz_{p(i-1)}$. Thus, the start address for the memory region for preceding channel $C_{p(i-1)}$ in the processing order is sufficiently away from the start address for the memory region for current channel $C_{p(i)}$ such that storing $Nb_{p(i-1)}$ quantities of size $Sz_{p(i-1)}$ of channel data in the memory region for preceding channel $C_{p(i-1)}$ does not result in storing channel data in the memory region for the current channel $C_{p(i)}$.

For the processing at the step S212 of FIG. 2, for each of the active channels $C_i$:
- during each CTU, the processing unit 102 stores a quantity of size $Sz_i$ of channel data in the associated memory region, working from the end of the memory region to start address $S_i$ of the memory region; and
- when $CTU\_C_i = Nb_i - 1$ (i.e. at the end of the CTU-processing-cycle for channel $C_i$), the processing unit 102 processes the $Nb_i$ quantities of size $Sz_i$ of channel data stored in the memory 104 for channel $C_i$.

2.3) Third Demultiplexing Embodiment

Figure 4C:
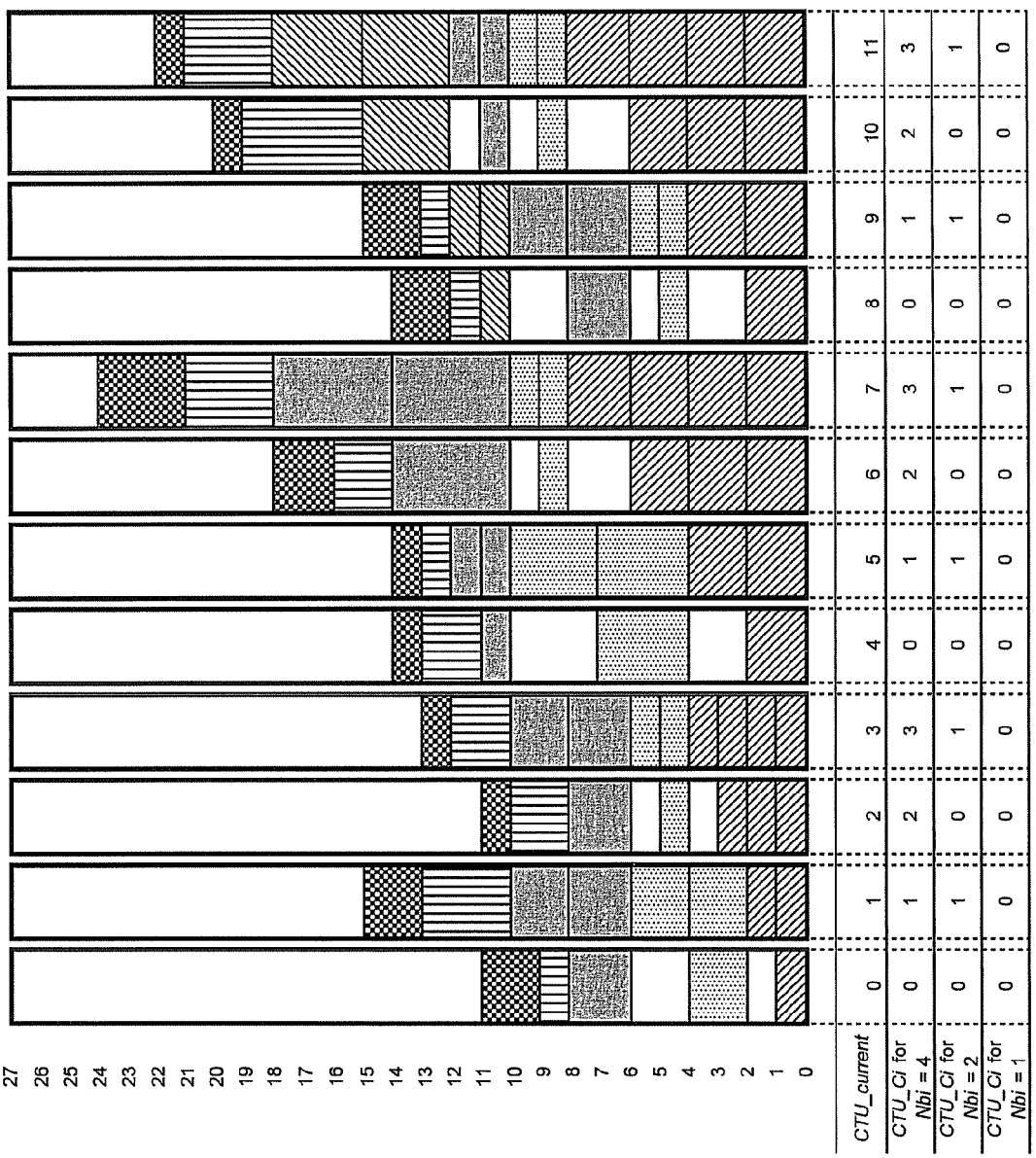

A third demultiplexing embodiment of the invention is schematically illustrated in FIG. 4c. In this embodiment:

The processing for channel $C_{p(i)}$ at the step S206 of FIG. 2 determines that the location of the memory region for channel $C_{p(i)}$ is to be updated when $CTU\_C_{p(i)} = 0$ (i.e. at the beginning of a CTU-processing-cycle for channel $C_{p(i)}$).

The processing for channel $C_{p(i)}$ at the step S208 of FIG. 2 is:
- If i=1, i.e. this is the first channel being considered by the processing 200 during this CTU, then the start address for the memory region associated with channel $C_{p(i)}$ is set to be the base address B, i.e. $S_{p(i)}$=B; and
- If i>1, i.e. this is not the first channel being considered by the processing 200 during this CTU, then the start address for the memory region for channel $C_{p(i)}$ is set such that $S_{p(i)} = S_{p(i-1)} + ((CTU\_C_{p(i-1)} + Nb_{p(i)}) \times Sz_{p(i-1)})$ Thus, the start address for the memory region for channel $C_{p(i)}$ is sufficiently away from the start address for the memory region for preceding channel $C_{p(i-1)}$ in the processing order such that storing the next (or subsequent) $Nb_{p(i)}$ quantities of size $Sz_{p(i-1)}$ of channel data in the memory region for preceding channel $C_{p(i-1)}$ does not result in overwriting channel data in the memory region for the current channel $C_{p(i)}$ that has not yet been processed by the processing unit 102. However, channel data for the current channel $C_{p(i)}$ that has already been processed during the previous CTU-processing-cycle for channel $C_{p(i)}$ by the processing unit 102 may be overwritten (without causing data loss or data corruption).

For the processing at the step S212 of FIG. 2, for each of the active channels $C_i$:
- during each CTU, the processing unit 102 stores a quantity of size $Sz_i$ of channel data in the associated memory region, working from the start address $S_i$ of the memory region to the end of the memory region; and
- when $CTU\_C_i = Nb_i - 1$ (i.e. at the end of the CTU-processing-cycle for channel $C_i$), the processing unit 102 processes the $Nb_i$ quantities of size $Sz_i$ of channel data stored in the memory 104 for channel $C_i$.

2.4) Fourth Demultiplexing Embodiment

Figure 4D:
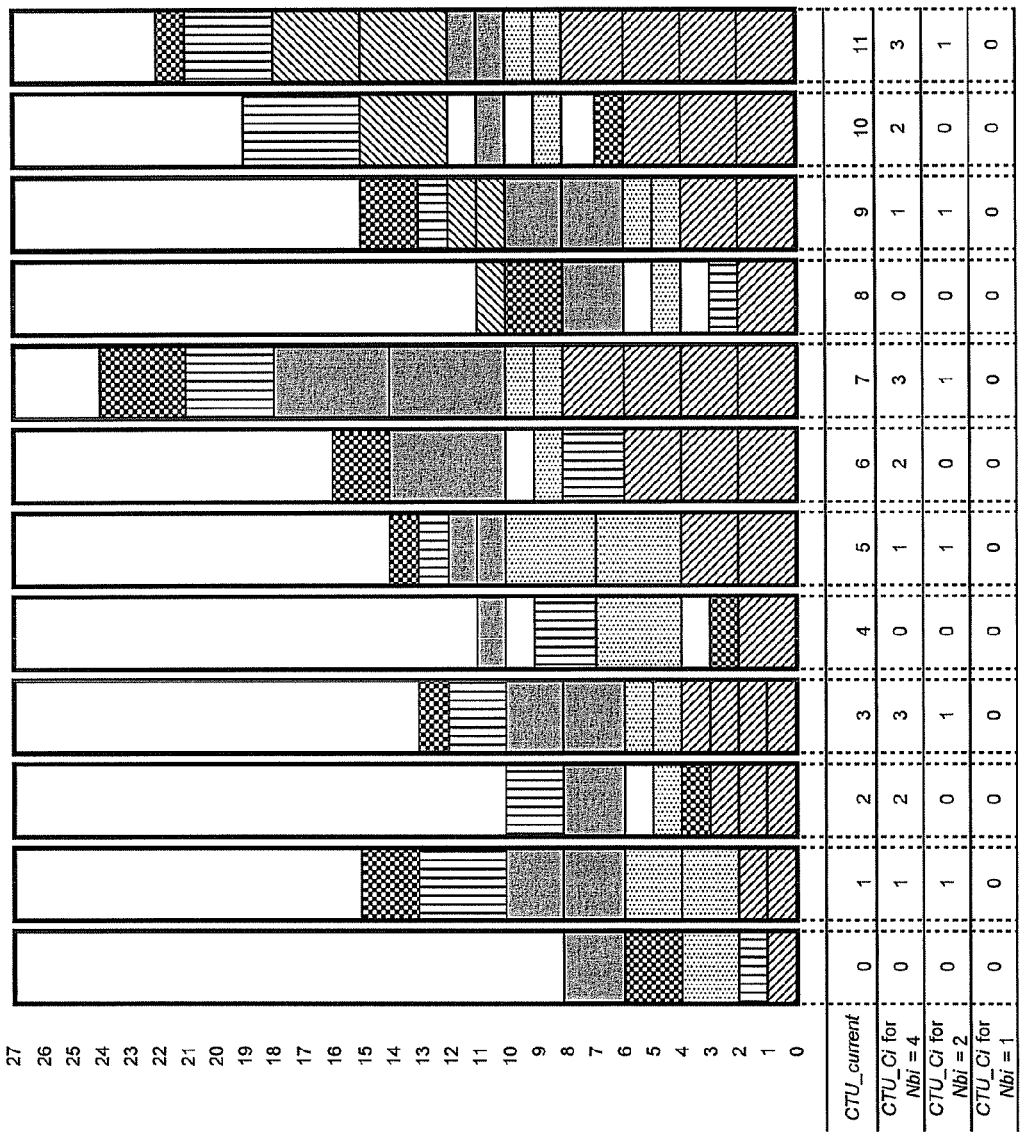

A fourth demultiplexing embodiment of the invention is schematically illustrated in FIG. 4d. In this embodiment:

The processing for channel $C_{p(i)}$ at the step S206 of FIG. 2 determines that the location of the memory region for channel $C_{p(i)}$ is to be updated when $CTU\_C_{p(i)} = 0$ (i.e. at the beginning of a CTU-processing-cycle for channel $C_{p(i)}$).

The processing for channel $C_{p(i)}$ at the step S208 of FIG. 2 is:
- If i=1, i.e. this is the first channel being considered by the processing 200 during this CTU, then the start address for the memory region associated with channel $C_{p(i)}$ is set to be the base address B, i.e. $S_{p(i)}$=B; and
- If i>1, i.e. this is not the first channel being considered by the processing 200 during this CTU, then the start address for the memory region for channel $C_{p(i)}$ is set such that
  if $Nb_i > 1$, then
  $S_{p(i)} = S_{p(i-1)} + ((CTU\_C_{p(i-1)} + Nb_{p(i)}) \times Sz_{p(i-1)})$. (Thus, the start address for the memory region for channel $C_{p(i)}$ is sufficiently away from the start address for the memory region for preceding channel $C_{p(i-1)}$ in the processing order such that storing the next (or subsequent) $Nb_{p(i)}$ quantities of size $Sz_{p(i-1)}$ of channel data in the memory region for preceding channel $C_{p(i-1)}$ does not result in overwriting channel data in the memory region for the current channel $C_{p(i)}$ that has not yet been processed by the processing unit 102. However, channel data for the current channel $C_{p(i)}$ that has already been processed during the previous CTU-processing-cycle for channel $C_{p(i)}$ by the processing unit 102 may be overwritten (without causing data loss or data corruption).
  if $Nb_i = 1$, then $S_{p(i)}$ is set to be the first (lowest) memory address following the base address B following which there is a contiguous region of size $Sz_{p(i)}$ that does not contain channel data that has not yet been processed by the processing unit 102.

For the processing at the step S212 of FIG. 2, for each of the active channels $C_i$:
- during each CTU, the processing unit 102 stores a quantity of size $Sz_i$ of channel data in the associated memory region, working from the start address $S_i$ of the memory region to the end of the memory region; and
- when $CTU\_C_i = Nb_i - 1$ (i.e. at the end of the CTU-processing-cycle for channel $C_i$), the processing unit 102 processes the $Nb_i$ quantities of size $Sz_i$ of channel data stored in the memory 104 for channel $C_i$.

3) Overlapping of Memory Regions

It should be noted that the memory regions for the channels $C_i$ may overlap. For example: (i) in FIGS. 3c and 3d, the memory region for channel $C_i$ ranges from 0-4 for CTU_current=0 . . . 3, whilst the memory region for channel $C_2$ ranges from 2-4 for CTU_current=2 and 3; (ii) in FIGS. 3c and 3d, the memory region for channel $C_1$ ranges from 0-8 for CTU_current=4 . . . 7, whilst the memory region for channel $C_2$ ranges from 4-6 for CTU_current=6 and 7 and the memory region for channel $C_3$ ranges from 6-14 for CTU_current=6 and 7; (iii) in FIGS. 4c and 4d, the memory region for channel $C_1$ ranges from 0-4 for CTU_current=0 . . . 3, whilst the memory region for channel $C_2$ ranges from 2-6 for CTU_current=0 and 1; and (iv) in FIGS. 4c and 4d, the memory region for channel $C_1$ ranges from 0-8 for CTU_current=8 . . . 11, whilst the memory region for channel $C_2$ ranges from 4-6 for CTU_current=8 and 9 and the memory region for channel $C_3$ ranges from 6-10 for CTU_current=8 and 9.

However, as can be seen, the area overlap between two such memory regions is arranged such that only one channel requires that area of overlap at a time. When demultiplexing data, the channel data stored in an area of overlap for a first channel is processed before channel data is stored in that area at a later stage for another channel. When multiplexing data, the channel data stored in an area of overlap for a first channel is output as multiplexed data before channel data is stored in that area at a later stage for another channel.

In other embodiments of the invention, for example those shown in FIGS. 3a, 3b, 4a and 4b, the locations of the memory regions are determined such that the memory regions do not overlap each other.

4) Alternatives

It will be appreciated that the processing unit 102 may determine the location of a memory region for a channel in a number of other ways such that (i) when demultiplexing, the processing unit 102 will not store channel data at a location in the memory 104 that is currently storing channel data that has not yet been processed and (ii) when multiplexing, the processing unit 102 will not store channel data at a location in the memory 104 that is currently storing channel data that has not yet been output as multiplexed data.

As an example, the processing unit 102 may wish to align a memory region for a channel within the memory 104 based on an alignment criterion. This criterion may be, for example, aligning a memory region so that it starts at a 1-byte, 2-byte, or 4-byte boundary within the memory 104. The start address $S_i$ for channel $C_i$ may be determined (according to the above-described equations) and may then be adjusted as follows: if alignment to 1-byte is required, then $S_i$ (as measured in bits) would be set to be $$\left\lceil \frac{S_i}{8} \right\rceil \times 8 \text{ bits;}$$

if alignment to 2-bytes is required, then $S_i$ (as measured in bits) would be set to be $$\left\lceil \frac{S_i}{16} \right\rceil \times 16 \text{ bits;}$$

and if alignment to 4-bytes is required, then $S_i$ (as measured in bits) would be set to be $$\left\lceil \frac{S_i}{32} \right\rceil \times 32 \text{ bits;}$$

and so on.

The example embodiments described above may be modified so that the calculation of start addresses $S_i$ involves determining a larger value than that given by the above-mentioned equations, for example by adding a predetermined constant offset to above equations.

In the example embodiments described above, the start address for a memory region is a lower address in the memory 104 than the end address for that memory region. However, it will be appreciated that the roles of the start address and end address for a memory region may be interchanged, so that the start address is higher than the end address for the memory region.

In the example embodiments described above, the memory regions are determined starting from the base address B. However, it will be appreciated that, in a similar manner, the memory regions could be determined working backwards from the end (top) of the memory 104, towards the base address B.

For multiplexing embodiments, it will be appreciated that the quantities of channel data being output from the memory 104 as multiplexed data need not be output from the positions in the channels' memory regions in the order shown in FIGS. 4a-4d. Similarly, for demultiplexing embodiments, it will be appreciated that the quantities of channel data being stored in the memory 104 need not be stored at the positions in the channels' memory regions in the order shown in FIGS. 3a-3d.

5) Memory Overflow Analysis

As an example to demonstrate the improvements made by embodiments of the invention over the above-described prior-art memory management, the demultiplexing embodiment of FIG. 4a will be analysed below. It will be appreciated that similar analysis can be performed for the other demultiplexing embodiments of FIGS. 4b-d and the multiplexing embodiments of FIGS. 3a-d.

Figure 5A:
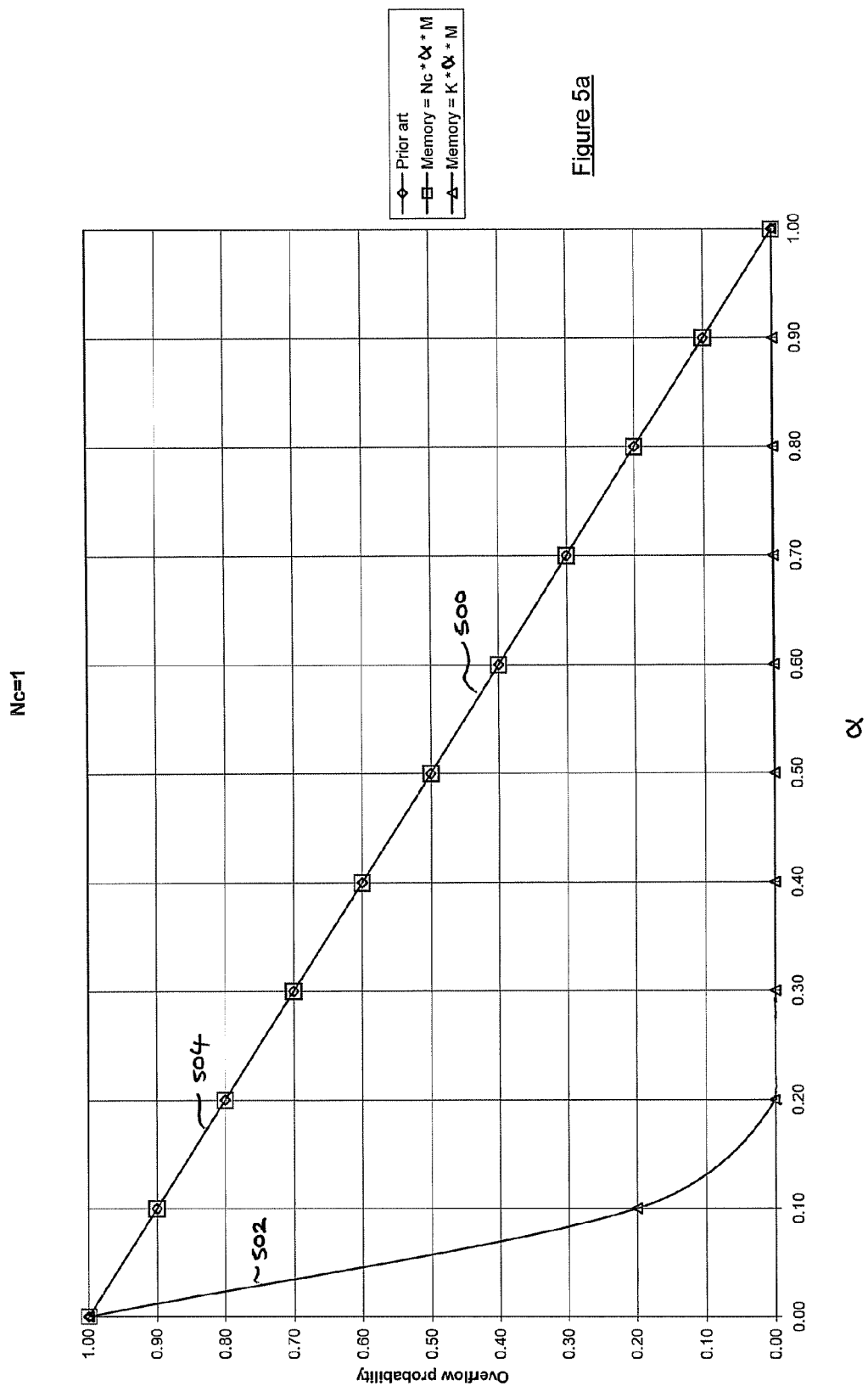
FIGS. 5a-e are graphs showing probabilities of memory overflow when storing demultiplexed channel data in various scenarios.
Figure 5B:
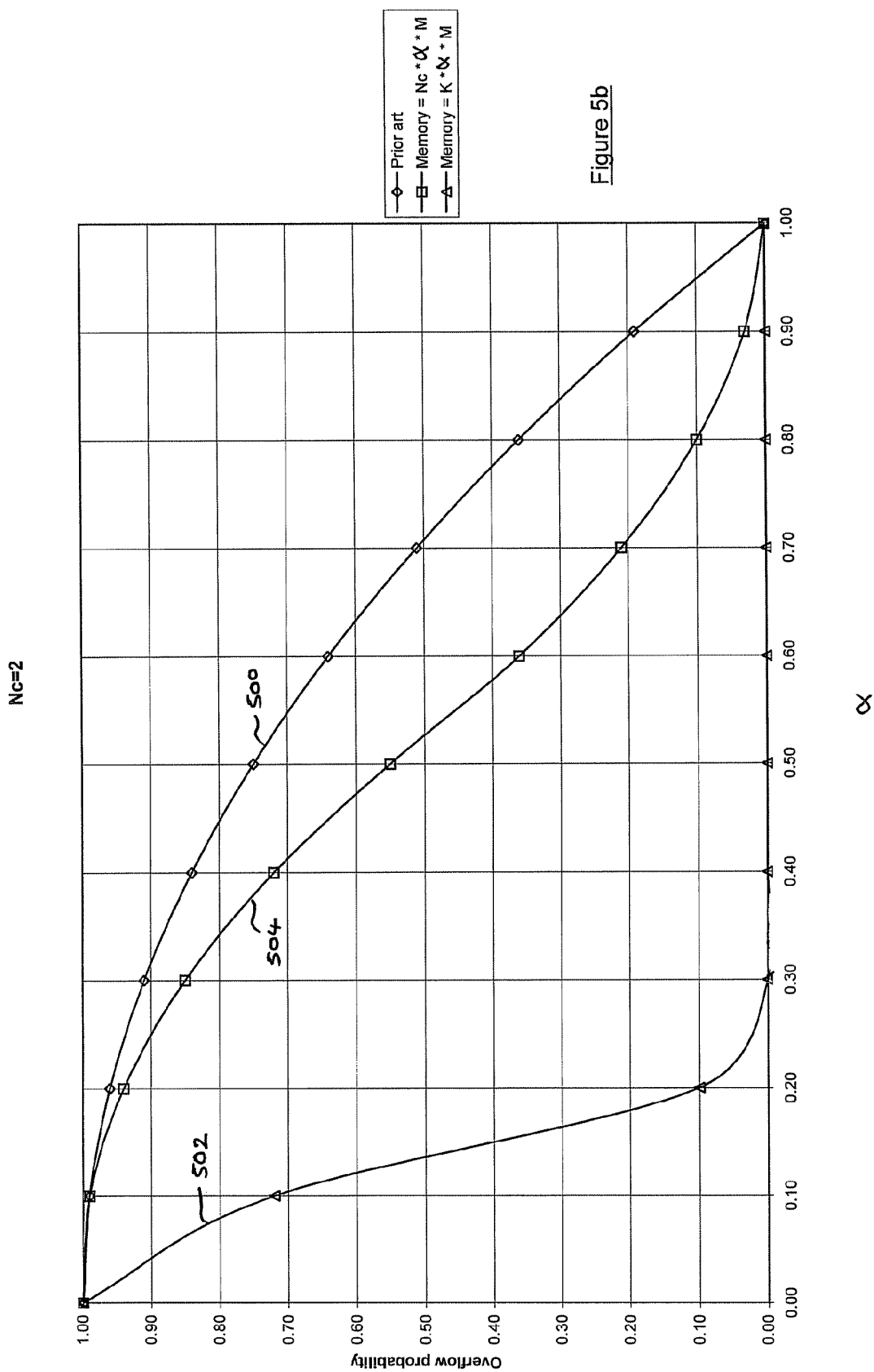
Figure 5C:
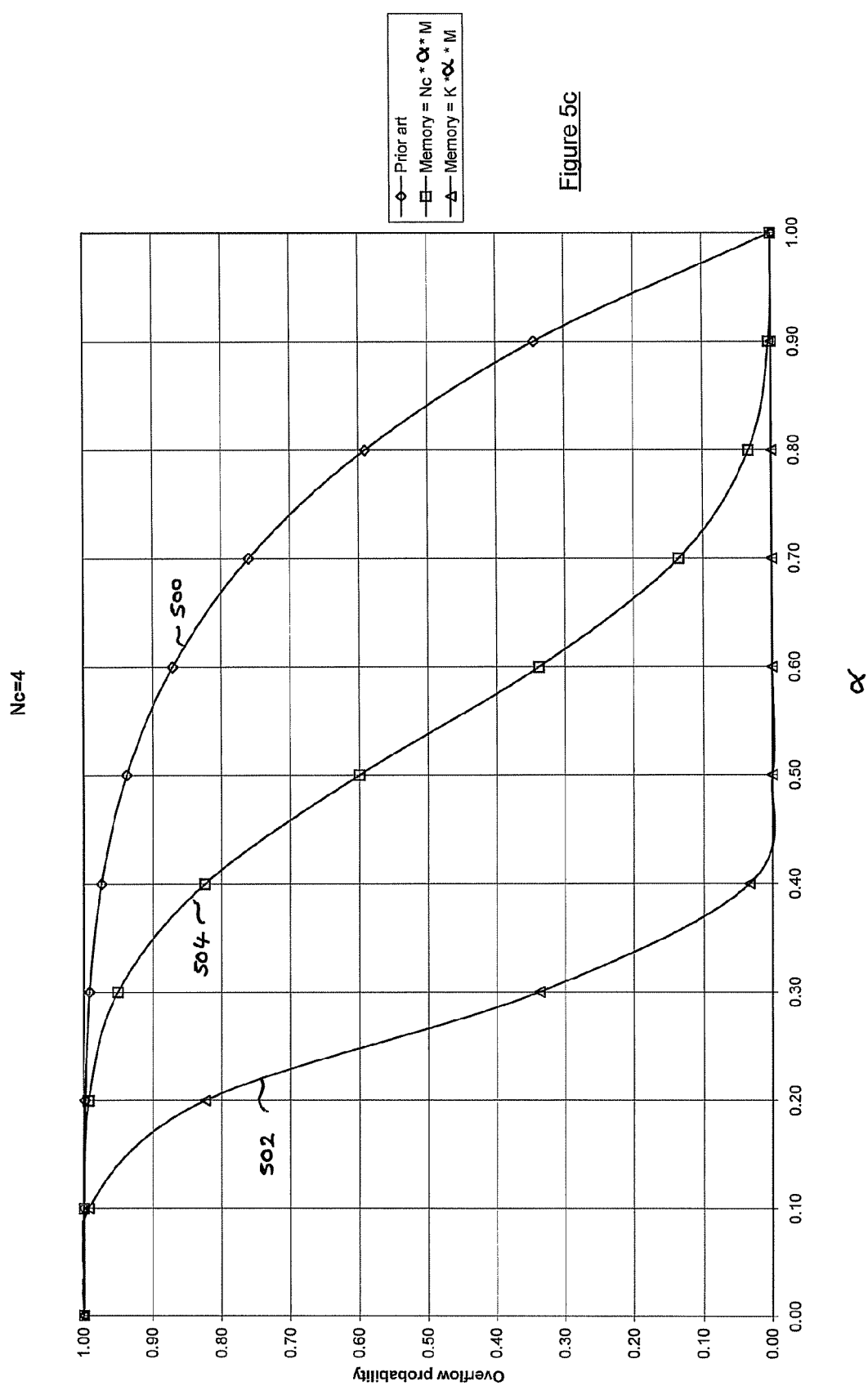
Figure 5D:
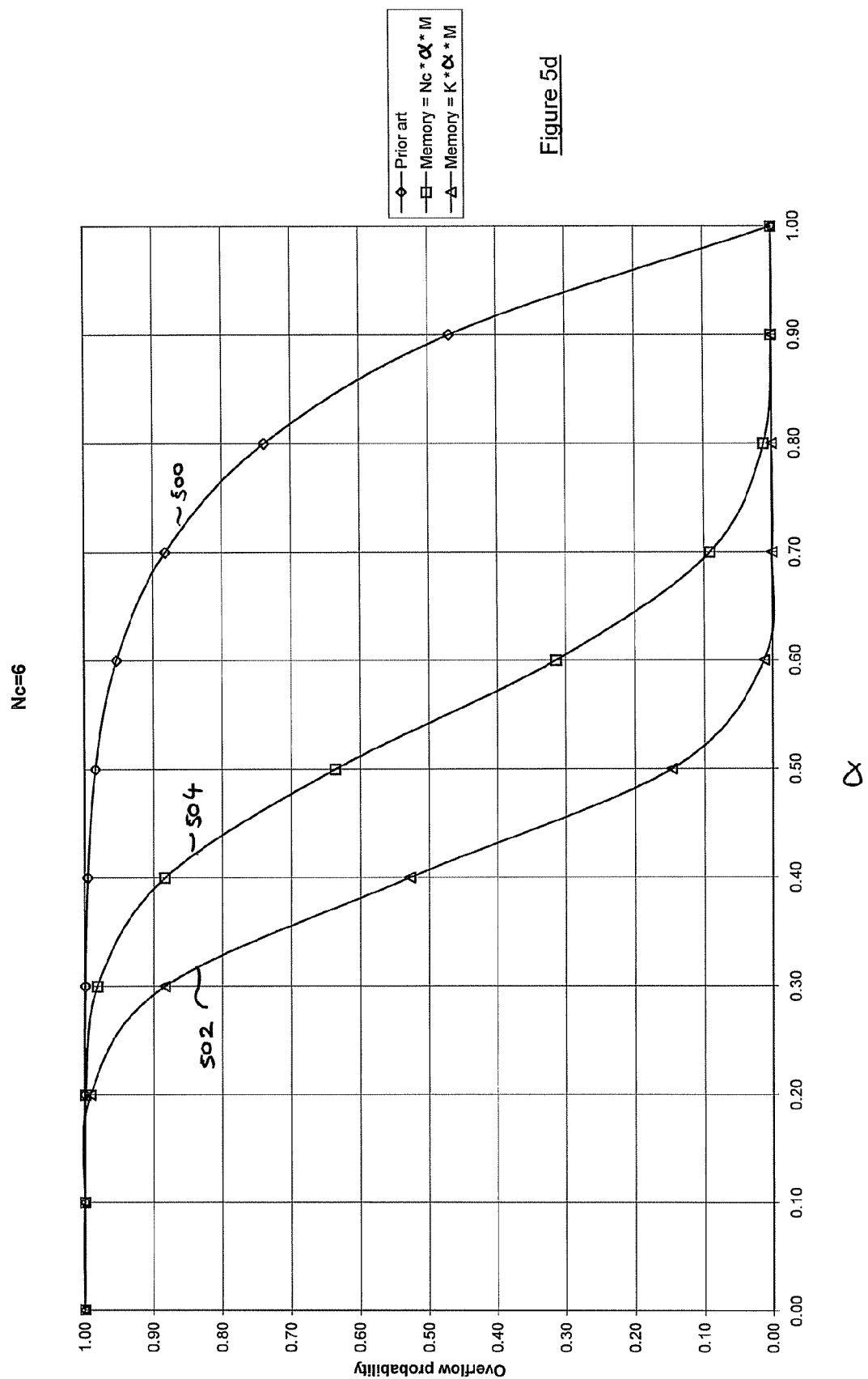
Figure 5E:
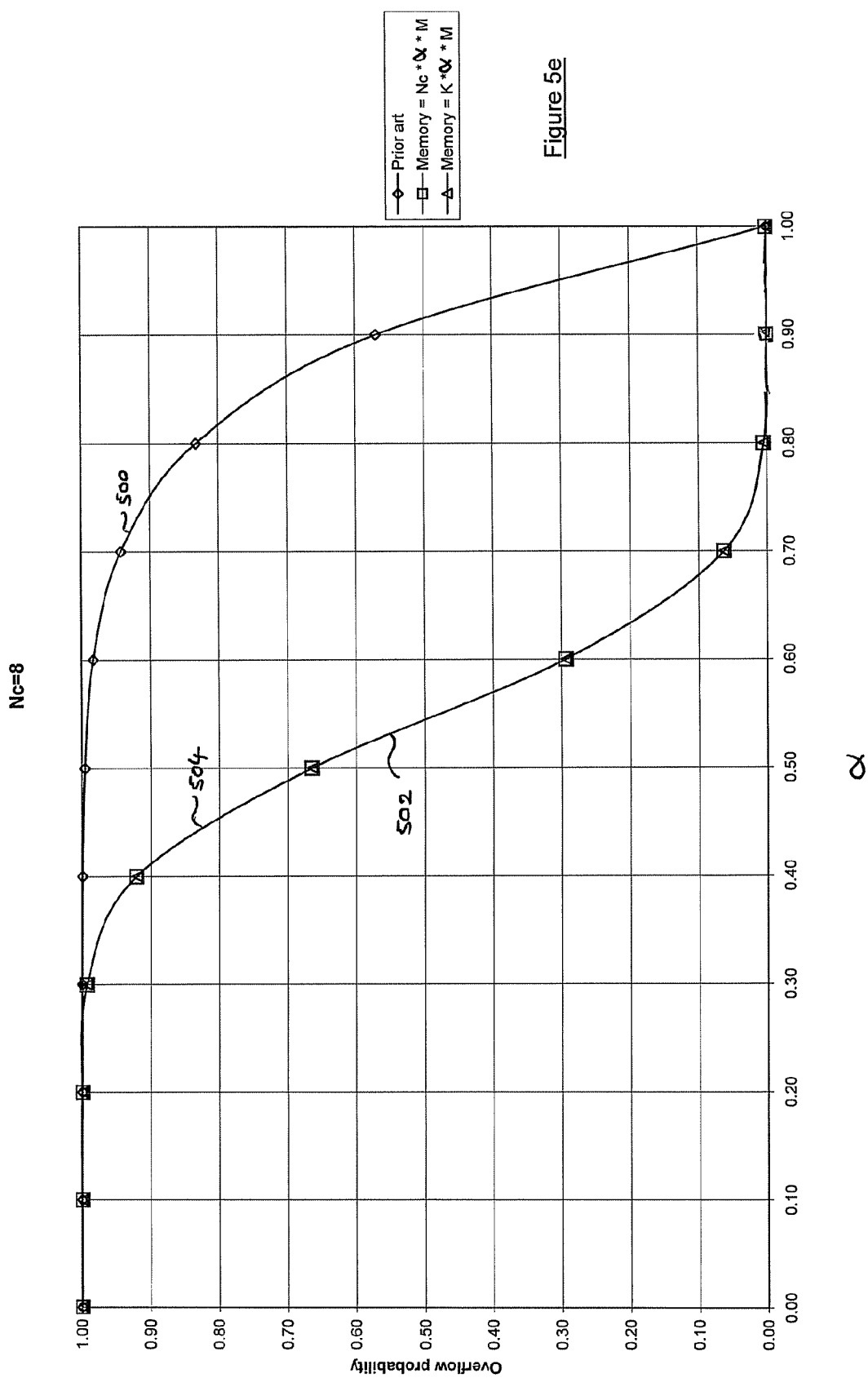

FIGS. 5a-e are graphs showing probabilities of memory overflow when storing demultiplexed channel data in the memory 104 in various scenarios, as described in more detail below. In FIGS. 5a-e, it is assumed that the maximum number of possible active channels (K) assumes the value 8. In FIG. 5a, the actual number of active channels $N_c$ is 1; in FIG. 5b, the actual number of active channels $N_c$ is 2; in FIG. 5c, the actual number of active channels $N_c$ is 4; in FIG. 5d, the actual number of active channels $N_c$ is 6; and in FIG. 5e, the actual number of active channels $N_c$ is 8.

For each channel $C_i$, the value $A_i$ will refer to the amount of channel data to be received for a channel before that channel data is processed by the processing unit 102, i.e. $A_i = Sz_i \times Nb_i$.

In this analysis, it is assumed that the maximum amount of channel data to be received for a channel before that channel data is processed by the processing unit 102 is of a predetermined maximum size M, i.e. $A_i \leq M$ for each channel $C_i$ for $1 \leq i \leq N_c$.

For values of r=0, 0.1, 0.2, . . . , 0.9, it shall be assumed (for this analysis), that $P(rM < A_i \leq (r+0.1)M) = 0.1$, i.e. the probability that the about of channel data to be received for channel $C_i$ before that channel data is processed by the processing unit 102 lies in the range $(rM, (r+0.1)M]$ is 0.1.

To store the demultiplexed channel data, it shall be assumed that the amount of memory 104 available to the processing unit 102 is $\alpha KM$, where $\alpha$ is a predetermined value assuming a value of 0, 0.1, 0.2, . . . , 0.9 or 1. Naturally, if $\alpha=1$, then the amount of memory 104 allocated to store demultiplexed channel data is sufficient for the worst-case-scenario in which $A_i=M$ for $1 \leq i \leq K$. Similarly, if $\alpha=0$, then no memory 104 is allocated to store demultiplexed channel data.

According to the above-mentioned prior-art demultiplexer, the demultiplexer assigns to each of the possible K channels an equal amount of memory 104 for storing demultiplexed channel data. Thus, each memory region for the possible K channels is of size $\alpha M$. Thus, the probability that, during the demultiplexing for a channel $C_i$, the memory region for the channel $C_i$ will overflow is $P(A_i > \alpha M) = 1 - \alpha$. Thus, the probability of at least one of the memory regions overflowing when storing demultiplexed channel data is 1-(1-

$(1-\alpha))^{N_c}=1-\alpha^{N_c}$. In FIGS. 5a-e, a plot of this is shown by the lines 500 having points shown by diamonds.

For the demultiplexing embodiment of FIG. 4a, when there are $N_c$ active channels the probability of there being a memory overflow when storing demultiplexed channel data in the memory 104 equals $P(A_1+A_2+\ldots+A_k>\alpha KM)$. In FIGS. 5a-e, a plot of this is shown by the lines 502 having points shown by triangles.

In some embodiments, the amount of memory allocated for storing demultiplexed channel data may be varied according to the number of active channels there current are. For example, instead of allocating $\alpha KM$ memory for storing demultiplexed channel data, the processing unit 102 may allocate $\alpha N_c M$ memory for storing demultiplexed channel data. In this case, for the demultiplexing embodiment of FIG. 4a, when there are $N_c$ active channels the probability of there being a memory overflow when storing demultiplexed channel data in the memory 104 equals $P(A_1+A_2+\ldots+A_k>\alpha N_c M)$. In FIGS. 5a-e, a plot of this is shown by the lines 504 having points shown by squares.

As can be seen from FIGS. 5a-e, significant reductions in the probability of overflow are achieved when using embodiments according to FIG. 4a as compared to the prior art demultiplexer. Similar results are achieved for other demultiplexing embodiments of the invention, and for multiplexing embodiments of the invention.

Thus, embodiments of the invention help reduce the probability of data loss or data corruption.

Similarly, embodiments of the invention may use a smaller amount of memory for storing channel data for a desired probability of data loss or corruption. For example, in FIG. 5c, for a probability of overflow of, say, 0.1, then (i) the prior art demultiplexer requires a value of $\alpha$ of around 0.97, so that the amount of memory required is 0.97 KM; whereas (ii) the two embodiments of FIG. 4a shown in FIG. 5c require a value of $\alpha$ of around 0.72 and 0.38 respectively, so that the respective amounts of memory required are 0.72 KM and 0.38 KM.

As can be seen from FIGS. 3a-3d, when CTU_current=0, 4 or 8, channel data is stored in the memory 104 in a contiguous manner, i.e. without unused regions (gaps) in-between, i.e. the determined memory regions are substantially contiguous in the memory 104. Thus, optimal memory management is achieved for multiplexing. Similarly, as can be seen from FIGS. 4a-4d, when CTU_current=3, 7 or 11, channel data is stored in the memory 104 in a contiguous manner, i.e. without unused regions in-between. Thus, optimal memory management is achieved for demultiplexing.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, the invention may for example be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a computer readable data carrier, such as a CD-rom or diskette, stored with data loadable in a memory of a computer system, the data representing the computer program. The data carrier may further be a data connection, such as a telephone cable or a wireless connection. The computer readable data carrier may be permanently, removably or remotely coupled to an information processing system such as apparatus 100. The computer readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

In accordance with at least one embodiment, a method of demultiplexing data comprises, during each of a series of time-units, receiving multiplexed data, wherein the multiplexed data comprises, for each of a plurality of channels, a corresponding quantity of channel data of a corresponding data size; during each of the series of time-units, for each of the plurality of channels, storing the corresponding quantity of channel data received during that time-unit in a contiguous region of a memory associated with that channel; wherein each of the plurality of channels has a corresponding time-unit-number such that, for each of the plurality of channels, the channel data stored in the corresponding region of the memory for that channel is to be processed after a number of time units equal to the time-unit-number for that channel has passed since channel data for that channel was last processed; and determining the locations of the regions of the memory based on the data sizes and the time-unit-numbers corresponding to one or more channels from the plurality of channels such that the step of storing will not store channel data at a location in the memory that is currently storing channel data that has not yet been processed. In accordance with at least one embodiment, the determining the locations of the regions of the memory comprises determining the location of the region of the memory for a first channel prior to determining the location of the region of the memory for a second channel if the time-unit-number corresponding to the first channel is greater than the time-unit-number corresponding to the second channel. In accordance with at least one embodiment, the locations of the regions of the memory are determined so that there are substantially no gaps between the regions of the memory within the memory. In accordance with at least one embodiment, at least two of the determined regions of the memory overlap. In accordance with at least one embodiment, the method further comprises repeating the determining to update the location of one or more of the regions of the memory. In accordance with at least one embodiment, the method further comprises determining whether the location of one or more of the regions of the memory should be updated during the current time-unit. In accordance with at least one embodiment, in a case in which it is determined that the location of the region of the memory corresponding to a channel should be updated during a time-unit in which channel data stored in the memory for that channel is processed, the location of that region of the memory is then updated after that channel data is processed. In accordance with at least one embodiment, in a case in which it is determined that the location of the region of the memory corresponding to a channel should be updated during a time-unit in which channel data is stored in the memory for that channel, the location of that region of the memory is then updated before that channel data is stored in the memory. In accordance with at least one embodiment, for each of the plurality of channels, the time-unit-number for that channel is a positive integer multiple of the time-unit-number for each of the other channels.

In accordance with at least one embodiment, a method of multiplexing data comprises, during each of a series of time-units, forming multiplexed data by outputting, for each of a plurality of channels, a corresponding quantity of channel data of a corresponding data size that is being stored in a memory; wherein each of the plurality of channels has a corresponding time-unit-number, the method comprising, for each of the plurality of channels, storing channel data in a corresponding region of the memory for that channel after a number of time units equal to the time-unit-number for that channel has passed since channel data for that channel was last stored in the memory; and determining the locations of the regions of the memory based on the data sizes and the time-unit-numbers corresponding to the one or more channels from the plurality of channels such that the step of storing will not store channel data at a location in the memory that is currently storing channel data that has not yet been output. In accordance with at least one embodiment, the determining the locations of the regions of the memory comprises determining the location of the region of the memory for a first channel prior to determining the location of the region of the memory for a second channel if the time-unit-number corresponding to the first channel is greater than the time-unit-number corresponding to the second channel. In accordance with at least one embodiment, the locations of the regions of the memory are determined so that there are substantially no gaps between the regions of the memory within the memory. In accordance with at least one embodiment, at least two of the determined regions of the memory overlap. In accordance with at least one embodiment, the method further comprises repeating the determining to update the location of one or more of the regions of the memory. In accordance with at least one embodiment, the method further comprises determining whether the location of one or more of the regions of the memory should be updated during the current time-unit. In accordance with at least one embodiment, in a case in which it is determined that the location of the region of the memory corresponding to a channel should be updated during a time-unit in which channel data stored in the memory for that channel is processed, the location of that region of the memory is then updated after that channel data is processed. In accordance with at least one embodiment, in a case in which it is determined that the location of the region of the memory corresponding to a channel should be updated during a time-unit in which channel data is stored in the memory for that channel, the location of that region of the memory is then updated before that channel data is stored in the memory. In accordance with at least one embodiment, for each of the plurality of channels, the time-unit-number for that channel is a positive integer multiple of the time-unit-number for each of the other channels. In accordance with at least one embodiment, the locations of the regions of the memory are determined so that there are substantially no gaps between the regions of the memory within the memory.

In accordance with at least one embodiment, an apparatus comprises a memory for storing channel data; and a processing unit arranged to carry out a method according to any embodiment of the methods described above. In accordance with at least one embodiment, a non-transitory computer readable media comprises a computer program which, when executed by a computer, carries out a method of demultiplexing data, the method comprising, during each of a series of time-units, receiving multiplexed data, wherein the multiplexed data comprises, for each of a plurality of channels, a corresponding quantity of channel data of a corresponding data size; during each of the series of time-units, for each of the plurality of channels, storing the corresponding quantity of channel data received during that time-unit in a contiguous region of a memory associated with that channel; wherein each of the plurality of channels has a corresponding time-unit-number such that, for each of the plurality of channels, the channel data stored in the corresponding region of the memory for that channel is to be processed after a number of time units equal to the time-unit-number for that channel has passed since channel data for that channel was last processed; and determining the locations of the regions of the memory based on the data sizes and the time-unit-numbers corresponding to one or more channels from the plurality of channels such that the step of storing will not store channel data at a location in the memory that is currently storing channel data that has not yet been processed. In accordance with at least one embodiment, a data carrying medium carries the computer program as described above. In accordance with at least one embodiment, the data carrying medium is a storage medium or a transmission medium.

What is claimed is:

1. Apparatus arranged to perform data demultiplexing, the apparatus comprising:
   an interface arranged to receive, during each of a series of time-units, multiplexed data, wherein the multiplexed data comprises, for each corresponding channel of a plurality of channels, a corresponding quantity of channel data of a corresponding data size;
   a memory; and
   a processing unit coupled to the interface and to the memory, the processing unit arranged to store, during each of the series of time-units, for each corresponding channel of the plurality of channels, the corresponding quantity of the channel data received during a corresponding time-unit of the time-units in a contiguous region of the memory associated with the corresponding channel, wherein each of the plurality of channels has a corresponding time-unit-number of time-unit-numbers such that, for each corresponding channel of the plurality of channels, the corresponding quantity of the channel data stored in the corresponding region of the memory for the corresponding channel is to be processed after a number of the time-units equal to the time-unit-number for the corresponding channel has passed since a previous corresponding quantity of the channel data for the corresponding channel was last processed, the processing unit further arranged to determine locations of the regions of the memory based on the data sizes and the time-unit-numbers corresponding to one or more channels from the plurality of channels such that the processing unit will not store the corresponding quantity of the channel data at a location in the memory that is currently storing any channel data that has not yet been processed.

2. The apparatus according to claim 1, in which the processor is further arranged, for determining the locations of the regions of the memory, to determine a first location of a first region of the memory for a first channel prior to determining a second location of a second region of the memory for a second channel if a first time-unit-number corresponding to the first channel is greater than a second time-unit-number corresponding to the second channel.

3. The apparatus according claim 1, in which the processor is further arranged to determine the locations of the regions of the memory so that there are substantially no gaps between the regions of the memory within the memory.

4. The apparatus according to claim 1, in which the processor is further arranged to determine the locations of the regions of the memory so that at least two of the regions of the memory overlap.

5. The apparatus according to claim 1, in which the processor is further arranged to repeat the determining of the locations of the regions of the memory to update one or more of the locations of one or more of the regions of the memory.

6. The apparatus according to claim 5, in which the processor is further arranged to determine whether the one or more of the locations of the one or more of the regions of the memory should be updated during a current time-unit of the time-units.

7. The apparatus according to claim 6, wherein one of the one or more of the locations of one of the one or more regions of the memory corresponding to a selected channel is to be updated during a scheduled time-unit in which selected channel data stored in the memory for the selected channel is processed, the processor being further arranged to update the one of the one or more locations of the one of the one or more regions of the memory after the selected channel data is processed.

8. The apparatus according to claim 6, wherein one of the one or more of locations of one of the one or more regions of the memory corresponding to a selected channel is to be updated during a scheduled time-unit in which selected channel data is stored in the memory for the selected channel, the processor being further arranged to update the one of the one or more locations of the one of the one or more regions of the memory before the selected channel data is stored in the memory.

9. The apparatus according to claim 1, in which, for each corresponding channel of the plurality of channels, a corresponding time-unit-number for the corresponding channel is a positive integer multiple of each corresponding time-unit-number for each other channel of the plurality of channels.

10. Apparatus arranged to perform data multiplexing, the apparatus comprising:
    a memory;
    an interface; and
    a processing unit coupled to the memory and to the interface, the processing unit arranged to form, during each of a series of time-units, multiplexed data by outputting via the interface, for each corresponding channel of a plurality of channels, a corresponding quantity of channel data of a corresponding data size of data sizes that is being stored in the memory, wherein each of the plurality of channels has a corresponding time-unit-number of time-unit-numbers, the processing unit further arranged to store, for each corresponding channel of the plurality of channels, the corresponding quantity of the channel data in a corresponding region of regions of the memory for the corresponding channel after a number of the time-units equal to the corresponding time-unit-number for the corresponding channel has passed since a previous corresponding quantity of the channel data for the corresponding channel was last stored in the memory, the processing unit further arranged to determine locations of the regions of the memory based on the data sizes and the time-unit-numbers corresponding to one or more channels of the plurality of channels such that the processing unit will not store the corresponding quantity of the channel data at a location in the memory that is currently storing any channel data that has not yet been output.

11. The apparatus according to claim 10, in which the processor is further arranged, for determining the locations of the regions of the memory, to determine a first location of a first region of the memory for a first channel prior to determining a second location of a second region of the memory for a second channel if a first time-unit-number corresponding to the first channel is greater than a second time-unit-number corresponding to the second channel.

12. The apparatus according claim 11, in which the processor is further arranged to determine the locations of the regions of the memory so that there are substantially no gaps between the regions of the memory within the memory.

13. The apparatus according claim 10, in which the processor is further arranged to determine the locations of the regions of the memory so that there are substantially no gaps between the regions of the memory within the memory.

14. The apparatus according to claim 10, in which the processor is further arranged to determine the locations of the regions of the memory so that at least two of the regions of the memory overlap.

15. The apparatus according to claim 10, in which the processor is further arranged to repeat the determining the locations of the regions of the memory to update one or more of the locations of one or more of the regions of the memory.

16. The apparatus according to claim 15, in which the processor is further arranged to determine whether the one or more locations of one or more of the regions of the memory should be updated during a current time-unit of the time-units.

17. The apparatus according to claim 16, wherein one of the one or more of the locations of the one of the one or more regions of the memory corresponding to a selected channel is to be updated during a scheduled time-unit in which selected channel data stored in the memory for the selected channel is processed, the processor being further arranged to update the one of the one or more locations of the one of the one or more regions of the memory after the selected channel data is processed.

18. The apparatus according to claim 16, wherein one of the one or more locations of one of the one or more regions of the memory corresponding to a selected channel is to be updated during a scheduled time-unit in which selected channel data is stored in the memory for the selected channel, the processor being further arranged to update the one of the one or more locations of the one of the one or more regions of the memory before the selected channel data is stored in the memory.

19. The apparatus according to claim 10, in which, for each corresponding channel of the plurality of channels, a corresponding time-unit-number for the corresponding channel is a positive integer multiple of each corresponding time-unit-number for each other channel of the plurality of channels.

20. A non-transitory computer readable medium comprising a computer program which, when executed by a computer, carries out a method of multiplexing data, the method comprising:
    during each of a series of time-units, forming multiplexed data by outputting, for each corresponding channel of a plurality of channels, a corresponding quantity of channel data of a corresponding data size of data sizes that is being stored in a memory;
    wherein each corresponding channel of the plurality of channels has a corresponding time-unit-number of time-unit-numbers, for each corresponding channel of the plurality of channels, storing the corresponding quantity of the channel data in a corresponding region of regions of the memory for the corresponding channel after a number of the time units equal to the corresponding time-unit-number for the corresponding channel has passed since a previous corresponding quantity of the channel data for the corresponding channel was last stored in the memory;
    determining locations of the regions of the memory based on the data sizes and the time-unit-numbers corresponding to one or more channels of the plurality of channels such that the step of storing will not store the corresponding quantity of the channel data at a location in the memory that is currently storing any channel data that has not yet been output.

* * * * *